(12) United States Patent
Shimada

(10) Patent No.: US 8,384,333 B2
(45) Date of Patent: Feb. 26, 2013

(54) ALTERNATING VOLTAGE CONTROL APPARATUS

(75) Inventor: Ryuichi Shimada, Tokyo (JP)

(73) Assignee: MERSTech, Inc., Tokyo (JP)

( * ) Notice: Subject to any disclaimer, the term of this patent is extended or adjusted under 35 U.S.C. 154(b) by 228 days.

(21) Appl. No.: 12/992,752

(22) PCT Filed: May 15, 2009

(86) PCT No.: PCT/JP2009/059392
§ 371 (c)(1),
(2), (4) Date: Jan. 24, 2011

(87) PCT Pub. No.: WO2009/139505
PCT Pub. Date: Nov. 19, 2009

(65) Prior Publication Data
US 2011/0121774 A1    May 26, 2011

(30) Foreign Application Priority Data
May 15, 2008 (WO) ................. PCT/JP2008/059397

(51) Int. Cl.
*H02P 1/24* (2006.01)

(52) U.S. Cl. .......................... 318/729; 318/438; 318/508

(58) Field of Classification Search ................ 318/729, 318/438, 508; 323/205, 212; 363/17, 34, 363/118
See application file for complete search history.

(56) References Cited

U.S. PATENT DOCUMENTS

| | | | | |
|---|---|---|---|---|
| 5,283,726 | A | * | 2/1994 | Wilkerson ...................... 363/41 |
| 5,657,212 | A | * | 8/1997 | Poon et al. ...................... 363/17 |
| 2006/0164024 | A1 | * | 7/2006 | Ushijima ...................... 315/274 |
| 2007/0159279 | A1 | * | 7/2007 | Shimada et al. ................ 335/40 |

FOREIGN PATENT DOCUMENTS

| | | | |
|---|---|---|---|
| JP | 2004-260991 A | | 9/2004 |
| JP | 3735673 | | 11/2005 |
| JP | 2007-58676 A | | 3/2007 |
| KR | 2007004152 | * | 1/2007 |

* cited by examiner

Primary Examiner — Walter Benson
Assistant Examiner — Iftekhar Mustafa
(74) Attorney, Agent, or Firm — International Knowledge Asset Office; Keiji Masaki

(57) ABSTRACT

The alternating voltage control apparatus which is inserted serially between an alternating-current power source and an inductive load and which controls adjustment of load voltage of the inductive load with a magnetic energy recovery switch reduces a voltage burden of a reverse conduction type semiconductor switch within the magnetic energy recovery switch and a capacitor and controls voltage to be supplied to the inductive load with a small advancing amount of a phase of current to be supplied to the inductive load.

20 Claims, 10 Drawing Sheets

ALTERNATING VOLTAGE CONTROL APPARATUS

TECHNICAL FIELD

The present invention relates to an alternating voltage control apparatus connected between an alternating-current power source and an inductive load, and in particular, relates to an alternating voltage control apparatus to control adjustment of load voltage with a magnetic energy recovery switch.

BACKGROUND ART

Presently, electric power energy systems are important social infrastructures which should not be at rest even for a moment. Accordingly, stabilization and control of load voltage are important.

Since there is a possibility that sound operation of equipment become damaged by a short-time voltage drop due to a short-time overcurrent such as rush current at lighting an incandescent lamp, starting rush of an induction motor, and saturated rush current at initial excitation rush of a transformer, high voltage is supplied at a supply side in an electric power system.

As a measure against voltage drops of distribution lines at the time of maximum load, an electric power supply system tends to supply voltage excessively by several percents. However, since being at the maximum load is less frequent normally, the voltage over a rated voltage is consumed unnecessarily in many cases. As a result, illumination with a non-inverter fluorescent lamp, a mercury-vapor lamp, a sodium-vapor lamp and the like provides brightness more than necessary. These electric-discharge lamps can be simply dimmed as energy-saving by appropriately decreasing input voltage in a continuous manner. Further, electric power efficiency of a general induction motor drops due to increasing of iron loss. With a small induction motor, it is well known that the motor efficiency is increased by decreasing load voltage to be slightly lower than a rated voltage when being operated at a load rate at a degree of 70% or less.

Typically, it is general that appropriate adjustment of alternating voltage is performed by tap-changing of a transformer. However, in the case of a mechanical type, there have been problems that the voltage output by the tap-changing is step-shaped and that time delay of operation occurs. Further, a slide transformer (i.e., a variable transformer) is expensive and has a problem with durability. Since a back-to-back method of an inverter/converter does not require frequency changing, it is considered that the adoption thereof increases cost and enlarges electric power loss.

Further, in a direct-current circuit, the voltage is controlled to be constant by a direct-current voltage adjusting circuit after electric power is converted from alternating-current to direct-current. As a technology to perform the same thing as the above at an alternating-current side, a magnetic amplifier utilizing ferroresonance existed in the past. However, little development has been made thereafter. An alternating voltage controller utilizing a thyristor has drawbacks that a current waveform is distorted and a lagging power factor of current (i.e., a state that current is lagged behind voltage) is caused as a result of voltage control. With a lagging power factor load such as an inductive load, it is also a problem that a large voltage noise is caused due to occurrence of high voltage at the time of voltage interruption.

Further, on the other hand, a circuit technology called a magnetic energy recovery switch (hereinafter, called "MERS") was proposed and already granted as a patent (see patent document 1).

The MERS utilizes a switching circuit or a semiconductor element without having reverse blocking capability, that is, being a reverse conduction type. For example, the switching circuit or the semiconductor element of the reverse conduction type adopt a circuit constituted with a self-turn-off device and a diode while a positive side of the self-turn-off device and a negative side of the diode is connected and a negative side of the self-turn-off device and a positive side of the diode is connected (hereinafter, simply called "reversely parallel" connection), a semiconductor element such as a power MOSFET incorporating a parasitic diode when manufacturing, or the like. In the following, the switching circuit or the semiconductor element of the reverse conduction type are simply called "reverse conduction type semiconductor switch".

The MERS includes a full-bridge circuit constituted with a first reverse conduction type semiconductor switch leg forming a first alternating-current terminal at a connecting point between a negative side of a self-turn-off device constituting a first reverse conduction type semiconductor switch (hereinafter, simply called " the negative side of the reverse conduction type semiconductor switch") and a positive side of a self-turn-off device constituting a second reverse conduction type semiconductor switch (hereinafter, simply called "the positive side of the reverse conduction type semiconductor switch") and a second reverse conduction type semiconductor switch leg forming a second alternating-current terminal at a connecting point between a negative side of a third reverse conduction type semiconductor switch and a positive side of a fourth reverse conduction type semiconductor switch, having a positive terminal formed by connecting both positive sides of the first reverse conduction type semiconductor switch and the third reverse conduction type semiconductor switch and having a negative terminal formed by connecting both negative sides of the second reverse conduction type semiconductor switch and the fourth reverse conduction type semiconductor switch, and a capacitor connected between the positive terminal and the negative terminal of the full-bridge circuit.

A circuit being an object to be controlled by the MERS is connected between the first alternating-current terminal and the second alternating-current terminal of the full-bridge circuit.

Here, the first reverse conduction type semiconductor switch and the fourth reverse conduction type semiconductor switch are assumed to be a first pair and the second reverse conduction type semiconductor switch and the third reverse conduction type semiconductor switch are assumed to be a second pair. By controlling ON/OFF states of the reverse conduction type semiconductor switches so that self-turn-off devices constituting the two reverse conduction type semiconductor switches of the second pair are to be in a blocked state (hereinafter, simply called "an OFF state of the reverse conduction type semiconductor switch") when self-turn-off devices constituting the two reverse conduction type semiconductor switches of the first pair are in a conductive state (hereinafter, simply called "an ON state of the reverse conduction type semiconductor switch") and the second pair is to be in an ON state when the first pair is in an OFF state, the MERS functions as a switch circuit of bidirectional current in which the capacitor is capable of absorbing "snubber energy" accumulated throughout the full-bridge circuit and the control object circuit and regenerating to the control target circuit when the current of the circuit is interrupted. The direction of current passing through the control target circuit can be switched between the forward direction and the reverse direction corresponding to a purpose and a range of the control.

When a circuit serially connecting an inductive load as a control target circuit and an alternating-current power source between the first alternating-current terminal and the second alternating-current terminal of the MERS is utilized, alternating-current power to be supplied to the inductive load can be controlled. It is actualized that the capacitor absorbs the "magnetic energy" accumulated at an inductance component of the inductive load (i.e., the capacitor is charged) and regenerates to the inductive load (i.e., the capacitor is discharged) due to resonance between the capacitor and the inductance component of the inductive load. The above was proposed as an alternating-current power source apparatus utilizing an MERS and already granted as a patent (see patent document 2).

In the alternating-current power source apparatus utilizing the MERS, electrostatic capacity of the capacitor being a capacity to be in a resonance state with the inductance of the inductive load is selected corresponding to a purpose and a range of control. In particular, by selecting the electrostatic capacity of the capacitor so that resonance frequency determined by the electrostatic capacity of the capacitor and the inductance of the inductive load is equal to or higher than the switching frequency of the reverse conduction type semiconductor switch, it is possible to perform soft switching operation as the self-turn-off device constituting the reverse conduction type semiconductor switch is at approximate zero voltage and zero current when the reverse conduction type semiconductor switch is turned on and the self-turn-off device constituting the reverse conduction type semiconductor switch is at approximate zero voltage when the reverse conduction type semiconductor switch is turned off.

In the alternating-current power source apparatus utilizing the MERS, the ON/OFF states of the reverse conduction type semiconductor switches are controlled so that the second pair of the reverse conduction type semiconductor switches is to be in an OFF state when the first pair is in an ON state and the second pair is to be ON state when the first pair is in an OFF state. The time ratio (i.e., the duty ratio) of ON time and OFF time of the reverse conduction type semiconductor switches is 0.5, that is, the ON time and the OFF time are the same. When time-base indication of the ON/OFF states of the reverse conduction type semiconductor switch is assumed to be a control signal, the control is performed so that a control signal phase is synchronized with a voltage phase of the alternating-current power source and the control signal phase is advanced from the voltage phase of the alternating-current power source (i.e., being in a state that variation of the control signal phase is advanced in terms of time). The alternating-current electric power to be supplied to the inductive load can be controlled by varying phase difference between the control signal phase and the voltage phase of the alternating-current power source corresponding to a purpose and a range. Further, it is characteristic that the supplying voltage to the inductive load can be heightened by advancing the current phase and the supplying voltage to the inductive load can be also lowered by drastically advancing the current phase.

In the alternating-current power source apparatus utilizing the MERS, when a power factor is improved by the MERS in the case with a load of a lagging power factor such as an inductive load, there has been a fear that the inductive load is damaged as the supplying voltage to the inductive load becomes overvoltage. In order to address the above, the present inventor proposed an alternating voltage control apparatus to make the power factor of the power source current to be 1 as a whole by supplying voltage lower than the voltage of the alternating-current power source to the inductive load as further drastically advancing the phase of current to the inductive load and by mating with current of a lagging power factor of another inductive load to which an MERS is not connected (hereinafter, simply called "the alternating voltage control apparatus with advanced-phase current"). The proposal was laid-open and already publicly known (see patent document 3).

[Patent document 1] Japanese Patent No. 3634982
[Patent document 2] Japanese Patent No. 3735673
[Patent document 3] Japanese Patent Application Laid-open No. 2007-058676

SUMMARY OF THE INVENTION

Problems to be Solved by the Invention

In an alternating voltage control apparatus with advanced-phase current, a power factor can be improved by utilizing two of a leading power factor load with an MERS circuit and another lagging power factor load to which an MERS circuit is not connected.

However, even though the voltage supplied to the inductive load is lowered by drastically advancing the phase of the current supplied to the inductive load, voltage being equal to or higher than the voltage of the alternating-current power source is generated within the MERS circuit. Further, a voltage burden of the capacitor is large, as well. Accordingly, there is a fear that the reverse conduction type semiconductor switch and the capacitor to be used become inhibition factors for apparatus downsizing as being required to have high durability against voltage. In addition, there has been a phenomenon that higher harmonics included in the current waveform appear more when the current phase is drastically advanced.

In order to address the above issues, the present invention provides an alternating voltage control apparatus capable of performing to control voltage to be supplied to an inductive load as reducing a voltage burden of a reverse conduction type semiconductor switch and a capacitor of an MERS circuit even when a phase advancing amount of current supplied to the inductive load is lessened.

Means for Solving the Problem

The present invention relates to an alternating voltage control apparatus to control adjusting of load voltage with a magnetic energy recovery switch, and the object of the present invention is achieved by providing the alternating voltage control apparatus which is inserted serially between an alternating-current power source and an inductive load and which controls load voltage applied to the inductive load, including a full-bridge type magnetic energy recovery switch circuit (hereinafter, a magnetic energy recovery switch is simply called "MERS") including a full-bridge circuit constituted with a first reverse conduction type semiconductor switch leg forming a first alternating-current terminal at a connecting point between a negative side of a self-turn-off device constituting a first reverse conduction type semiconductor switch (hereinafter, simply called "the negative side of the reverse conduction type semiconductor switch") and a positive side of a self-turn-off device constituting a second reverse conduction type semiconductor switch (hereinafter, simply called "the positive side of the reverse conduction type semiconductor switch") and a second reverse conduction type semiconductor switch leg forming a second alternating-current terminal at a connecting point between a negative side of a third reverse conduction type semiconductor switch and a positive side of a fourth reverse conduction type semiconductor switch, having a positive terminal formed by connecting the positive side of the first reverse conduction type semiconductor switch and the positive side of the third reverse conduction type semiconductor switch and having a negative terminal formed by connecting the negative side of the second reverse conduction type semiconductor switch and the negative side of the fourth reverse conduction type semiconductor switch, as the reverse conduction type semiconductor switch being a circuit constituting with a self-turn-off device and a diode while a positive side of the self-turn-off device and a negative side of the diode is connected and a negative side of the self-turn-off device and a positive side of the diode is connected or an equivalent semiconductor element (hereinafter, simply called "reverse conduction type semiconductor switch"), and a capacitor connected between the positive terminal and the negative terminal of the full-bridge circuit, an alternating-current reactor having one end connected to the first alternating-current terminal of the full-bridge type MERS circuit, a step-down transformer having a primary side connected to the alternating-current power source and having one end of a secondary side connected to the other end of the alternating-current reactor, and control means, wherein the second alternating-current terminal is connected to the inductive load, the control means controls ON/OFF states of the reverse conduction type semiconductor switches so that the self-turn-off devices constituting the two reverse conduction type semiconductor switches of a second pair to be in a blocked state (hereinafter, simply called "an OFF state of the reverse conduction type semiconductor switch") when the self-turn-off devices constituting the two reverse conduction type semiconductor switches of a first pair are in a conductive state (hereinafter, simply called "an ON state of the reverse conduction type semiconductor switch") and the second pair is to be in an ON state when the first pair is in an OFF state, assuming that the first reverse conduction type semiconductor switch and the fourth reverse conduction type semiconductor switch are to be the first pair and the second reverse conduction type semiconductor switch and the third reverse conduction type semiconductor switch are to be the second pair, and the control means further controls voltage to be applied to the inductive load to generate voltage compensating reactance voltage of the inductive load at the capacitor by controlling a phase of a gate control signal in synchronization with a voltage phase of the alternating-current power source when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

Further, the object thereof is achieved by providing the alternating voltage control apparatus, wherein the capacitor is a polar capacitor. Furthermore, the object thereof is achieved by providing the alternating voltage control apparatus, wherein a value of electrostatic capacity (C) of the capacitor is set so that resonance frequency (fres) determined from values of the electrostatic capacity (C) of the capacitor and inductance (L) of the inductive load is to be equal to or higher than frequency (fac) of the alternating-current power source.

Furthermore, the object thereof is achieved by providing the alternating voltage control apparatus, wherein a range of a phase angle of the gate control signal is set to be between 0 degree and 90 degrees or between 0 degree and −180 degrees in the condition that difference between phase variation of the gate control signal and voltage phase of the alternating-current power source is denoted as the phase angle of the gate control signal which is indicated by a plus angle as being "advancing" in the case that the phase variation of the gate control signal is advanced from the voltage phase of the alternating-current power source in terms of time and which is indicated by a minus angle as being "delaying" in the case that the phase variation of the gate control signal is delayed from the voltage phase of the alternating-current power source in terms of time.

Furthermore, the object thereof is achieved by providing an alternating voltage control apparatus which is inserted serially between an alternating-current power source and an inductive load and which controls load voltage applied to the inductive load, including a single-capacitor lateral type half-bridge MERS circuit including a reverse conduction type semiconductor switch leg as connecting a negative side of a first reverse conduction type semiconductor switch and a negative side of a second reverse conduction type semiconductor switch, and a capacitor connected between a first alternating-current terminal being a positive side of the first reverse conduction type semiconductor switch and a second alternating-current terminal being a positive side of the second reverse conduction type semiconductor switch, an alternating-current reactor having one end connected to the first alternating-current terminal of the single-capacitor lateral type half-bridge MERS circuit, a step-down transformer having a primary side connected to the alternating-current power source and having one end of a secondary side connected to the other end of the alternating-current reactor, and control means, wherein the second alternating-current terminal is connected to the inductive load, the control means controls ON/OFF states of the reverse conduction type semiconductor switches so that the first reverse conduction type semiconductor switch and the second reverse conduction type semiconductor switch are not to be simultaneously in an OFF state while setting the second reverse conduction type semiconductor switch in an OFF state when the first reverse conduction type semiconductor switch is in an ON state and setting the second reverse conduction type semiconductor switch in an ON state when the first reverse conduction type semiconductor switch is in an OFF state, and the control means further controls voltage to be applied to the inductive load to generate voltage compensating reactance voltage of the inductive load at the capacitor by controlling a phase of a gate control signal in synchronization with a voltage phase of the alternating-current power source when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

Furthermore, the object thereof is achieved by providing the alternating voltage control apparatus, wherein connection polarities of the first reverse conduction type semiconductor switch and the second reverse conduction type semiconductor switch are mutually interchanged.

Furthermore, the object thereof is achieved by providing the alternating voltage control apparatus, wherein a value of electrostatic capacity (C) of the capacitor is set so that resonance frequency (fres) determined from values of the electrostatic capacity (C) of the capacitor and inductance (L) of the inductive load is equal to or higher than frequency (fac) of the alternating-current power source.

Furthermore, the object thereof is achieved by providing an alternating voltage control apparatus which is inserted serially between an alternating-current power source and an inductive load and which controls load voltage applied to the inductive load, including a longitudinal half-bridge MERS circuit including a reverse conduction type semiconductor switch leg forming a first alternating-current terminal at a connecting point between a negative side of a first reverse conduction type semiconductor switch and a positive side of a second reverse conduction type semiconductor switch and, a capacitor circuit constituted with a first capacitor clamp circuit having a first diode and a first capacitor connected in parallel and a second capacitor clamp circuit having a second diode and a second capacitor connected in parallel as forming a second alternating-current terminal at a connecting point between a positive side of the first diode and a negative side of the second diode, having a positive terminal formed at a connecting point between a positive side of the first reverse conduction type semiconductor switch and a negative side of the first diode and having a negative terminal formed at a connecting point between a negative side of the second reverse conduction type semiconductor switch and a positive side of the second diode, an alternating-current reactor having one end connected to the first alternating-current terminal of the longitudinal type half-bridge MERS circuit, a step-down transformer having a primary side connected to the alternating-current power source and having one end of a secondary side connected to the other end of the alternating-current reactor, and control means, wherein the second alternating-current terminal is connected to the inductive load, the control means controls ON/OFF states of the reverse conduction type semiconductor switches so that the first reverse conduction type semiconductor switch and the second reverse conduction type semiconductor switch are not to be simultaneously in an ON state while setting the second reverse conduction type semiconductor switch in an OFF state when the first reverse conduction type semiconductor switch is in an ON state and setting the second reverse conduction type semiconductor switch in an ON state when the first reverse conduction type semiconductor switch is in an OFF state, and the control means further controls voltage to be applied to the inductive load to generate voltage compensating reactance voltage of the inductive load at the first capacitor and the second capacitor by controlling a phase of a gate control signal in synchronization with a voltage phase of the alternating-current power source when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

Furthermore, the object thereof is achieved by providing an alternating voltage control apparatus which is inserted serially between an alternating-current power source and an inductive load and which controls load voltage applied to the inductive load, including a double-capacitor lateral type half-bridge MERS circuit including a first capacitor shorted circuit having a first reverse conduction type semiconductor switch and a first capacitor connected in parallel as a positive side of the first reverse conduction type semiconductor switch being a first alternating-current terminal and a second capacitor shorted circuit having a second reverse conduction type semiconductor switch and a second capacitor connected in parallel as a positive side of the second reverse conduction type semiconductor switch being a second alternating-current terminal, as connecting a negative side of the first reverse conduction type semiconductor switch and a negative side of the second reverse conduction type semiconductor switch, an alternating-current reactor having one end connected to the first alternating-current terminal of the double-capacitor lateral type half-bridge MERS circuit, a step-down transformer having a primary side connected to the alternating-current power source and having one end of a secondary side connected to the other end of the alternating-current reactor, and control means, wherein the second alternating-current terminal is connected to the inductive load, the control means controls ON/OFF states of the reverse conduction type semiconductor switches so that the first reverse conduction type semiconductor switch and the second reverse conduction type semiconductor switch are not to be simultaneously in an ON state while setting the second reverse conduction type semiconductor switch in an OFF state when the first reverse conduction type semiconductor switch is in an ON state and setting the second reverse conduction type semiconductor switch in an ON state when the first reverse conduction type semiconductor switch is in an OFF state, and the control means further controls voltage to be applied to the inductive load to generate voltage compensating reactance voltage of the inductive load at the first capacitor and the second capacitor by controlling a phase of a gate control signal in synchronization with a voltage phase of the alternating-current power source when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

Furthermore, the object thereof is achieved by providing the alternating voltage control apparatus, wherein the self-turn-off device constituting the reverse conduction type semiconductor switch is a field effect transistor or a semiconductor element having the similar structure thereto, and the control means controls the reverse conduction type semiconductor switch to be in an ON state when the diode constituting the reverse conduction type semiconductor switch is in a conduction state in the forward direction.

Furthermore, the object thereof is achieved by providing the alternating voltage control apparatus, wherein the first capacitor and the second capacitor are respectively polar capacitors.

Furthermore, the object thereof is achieved by providing the alternating voltage control apparatus, wherein connection polarities of the first reverse conduction type semiconductor switch and the second reverse conduction type semiconductor switch are mutually interchanged.

Furthermore, the object thereof is achieved by providing the alternating voltage control apparatus, wherein connection polarities of the first reverse conduction type semiconductor switch and the second reverse conduction type semiconductor switch are mutually interchanged, and connection polarities of the first capacitor and the second capacitor are mutually interchanged.

Furthermore, the object thereof is achieved by providing the alternating voltage control apparatus, wherein values of electrostatic capacities ($C_1$, $C_2$) of the first capacitor and the second capacitor are respectively set so that first resonance frequency ($fres_1$) determined from values of the electrostatic capacity ($C_1$) of the first capacitor and inductance (L) of the inductive load and second resonance frequency ($fres_2$) determined from values of the electrostatic capacity ($C_2$) of the second capacitor and the inductance (L) of the inductive load are set respectively to be equal to or higher than frequency ($fac$) of the alternating-current power source.

Furthermore, the object thereof is achieved by providing the alternating voltage control apparatus, wherein the alternating-current power source is directly connected to the other end of the alternating-current reactor while removing the step-down transformer.

Furthermore, the object thereof is achieved by providing the alternating voltage control apparatus, further including a power factor compensating capacitor connected between terminals of the alternating-current power source in parallel.

Furthermore, the object thereof is achieved by providing the alternating voltage control apparatus, wherein a range of a phase angle of the gate control signal is set to be between 0 degree and 90 degrees or between 0 degree and −90 degrees in the condition that difference between phase variation of the gate control signal and voltage phase of the alternating-current power source is denoted as the phase angle of the gate control signal which is indicated by a plus angle as being "advancing" in the case that the phase variation of the gate control signal is advanced from the voltage phase of the alternating-current power source in terms of time and which is indicated by a minus angle as being "delaying" in the case that the phase variation of the gate control signal is delayed from the voltage phase of the alternating-current power source in terms of time.

Furthermore, the object thereof is achieved by providing the alternating voltage control apparatus, wherein a range of a phase angle of the gate control signal is continuously kept at 0 degree.

Effects of the Invention

With an alternating voltage control apparatus according to the present invention, voltage to be supplied to a load can be controlled without drastically advancing a phase of current supplied to the load.

Further, a voltage burden of a reverse conduction type semiconductor switch and a capacitor of an MERS circuit can be reduced and downsizing of the alternating voltage control apparatus according to the present invention is promoted.

Further, since the current phase is not drastically advanced, higher harmonics included in the current waveform can be reduced.

Furthermore, there are many effects such that voltage to be supplied to the load is lowered when the voltage of the alternating-current power source is excessively high and the voltage to be supplied to the load can be appropriately maintained when the voltage of the alternating-current power source is lowered.

DESCRIPTION OF SYMBOLS

Figure 1:
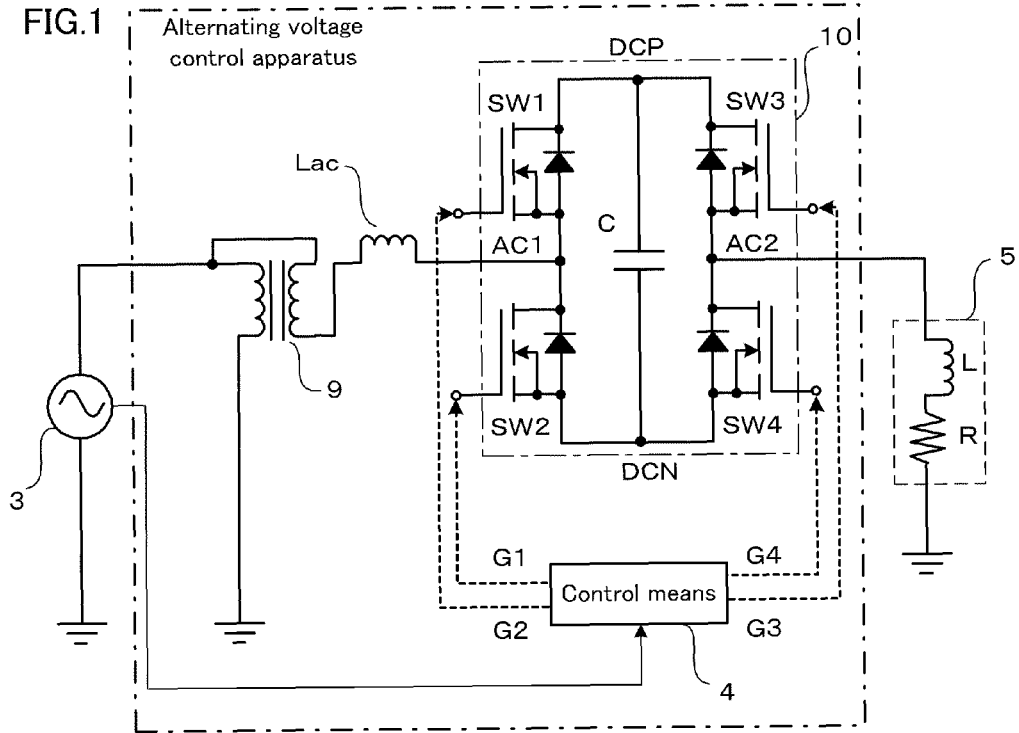
FIG. 1 is a circuit block diagram illustrating a configuration of the first embodiment according to the present invention.

3 Alternating-current power source
4 Control means
5 Inductive load
9 Step-down transformer
10 Full-bridge type MERS circuit
11 Double-capacitor lateral type half-bridge MERS circuit
12 Another aspect of double-capacitor lateral type half-bridge MERS circuit
21 Single-capacitor lateral type half-bridge MERS circuit
22 Another aspect of single-capacitor lateral type half-bridge MERS circuit
30 Longitudinal type half-bridge MERS circuit
AC1 First alternating-current terminal
AC2 Second alternating-current terminal
DCP Positive terminal
DCN Negative terminal
G1 Gate control signal of first reverse conduction type semiconductor switch
G2 Gate control signal of second reverse conduction type semiconductor switch
G3 Gate control signal of third reverse conduction type semiconductor switch
G4 Gate control signal of fourth reverse conduction type semiconductor switch
SW1 First reverse conduction type semiconductor switch
SW2 Second reverse conduction type semiconductor switch
SW3 Third reverse conduction type semiconductor switch
SW4 Fourth reverse conduction type semiconductor switch
C Capacitor
C1 First capacitor
C2 Second capacitor
Ccom Power factor compensating capacitor
D1 First diode
D2 Second diode
L Inductance component of inductive load
Lac Alternating-current reactor
R Resistance component of inductive load PSW Power source switch
Isw1 Current passing through first reverse conduction type semiconductor switch
Isw2 Current passing through second reverse conduction type semiconductor switch
$I_{load}$ Current (i.e., load current) passing through inductive load
Iin Current supplied from alternating-current power source
Vac Voltage of alternating-current power source
Vac_rms Effective voltage of alternating-current power source
Vc Voltage between both ends of capacitor
Vc1 Voltage between both ends of first capacitor
Vc2 Voltage between both ends of second capacitor
Vin Voltage supplied to bridge circuit
Vin_rms Effective voltage supplied to bridge circuit
$V_{load}$ Voltage (i.e., load voltage) supplied to inductive load
$V_{load}$_rms Effective voltage supplied to inductive load
VAac Apparent voltage measured at alternating-current power source
Wac Effective electric power measured at alternating-current power source
PFac Power factor measured at alternating-current power source
α Phase angle of gate control signal
(fac) Frequency of alternating-current power source
(fsw) Switching frequency of reverse conduction type semiconductor switch
(fres), (fres1), (fres2) Resonance frequency
(C) Electrostatic capacity of capacitor
(C1) Electrostatic capacity of first capacitor
(C2) Electrostatic capacity of second capacitor
(L) Inductance of inductive load
(R) Equivalent resistance of inductive load
(Lac) Inductance of alternating-current reactor

BEST MODE FOR CARRYING OUT THE INVENTION

In the following, embodiments according to the present invention will be described with reference to the drawings. The same reference numeral is given to the same structural element, member or process illustrated in each drawing and redundant descriptions are appropriately skipped. Further, the embodiments are examples not limiting the present invention. All the features and combinations thereof described in the embodiments are not necessarily essential for the present invention.

In the following description, a self-turn-off device denotes an electronic component having capability to control a conducting state and a blocking state of the element in the forward direction by applying a control signal to a gate of the element.

Further, a gate control signal denotes a signal to control ON/OFF states of a reverse conduction type semiconductor switch. Here, the ON/OFF states of the reverse conduction type semiconductor switch are assumed to be matched with duration time of an ON signal/duration time of an OFF signal of the gate control signal.

That is, the reverse conduction type semiconductor switch is kept in an ON state while the gate control signal to make the reverse conduction type semiconductor switch be on is continued, and then, the reverse conduction type semiconductor switch is kept in an OFF state while the gate control signal to make the reverse conduction type semiconductor switch be off is continued.

Figure 11:
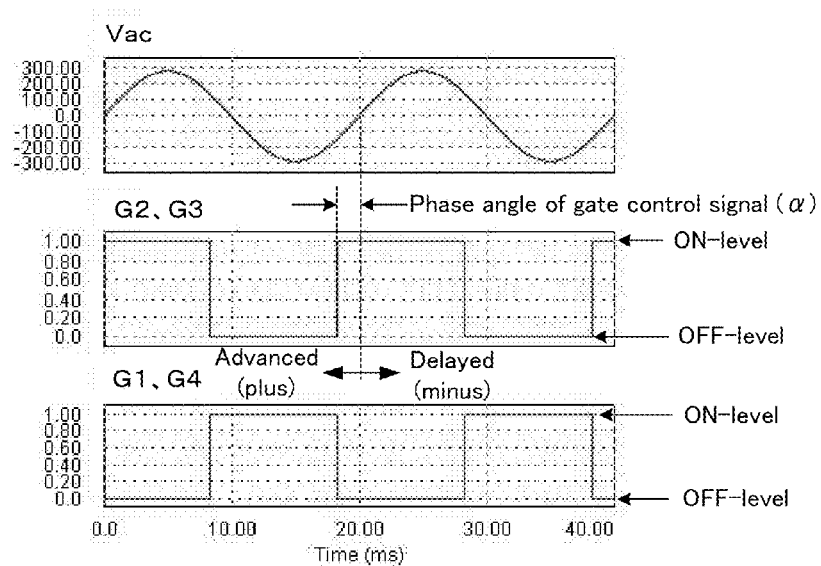
FIG. 11 shows relation between a voltage phase of the alternating-current power source and a phase angle α of a gate control signal.

Further, FIG. 11 illustrates definition of a phase angle of the gate control signal.

More specifically, regarding phase variation of the gate control signal, difference against a voltage phase of an alternating-current power source 3 is denoted as a phase angle α of the gate control signal which is indicated by a plus angle as being "advancing" in the case that the phase variation of the gate control signal is advanced from the voltage phase of the alternating-current power source 3 in terms of time and which is indicated by a minus angle as being "delaying" in the case that the phase variation of the gate control signal is delayed from the voltage phase of the alternating-current power source 3 in terms of time.

Figure 12:
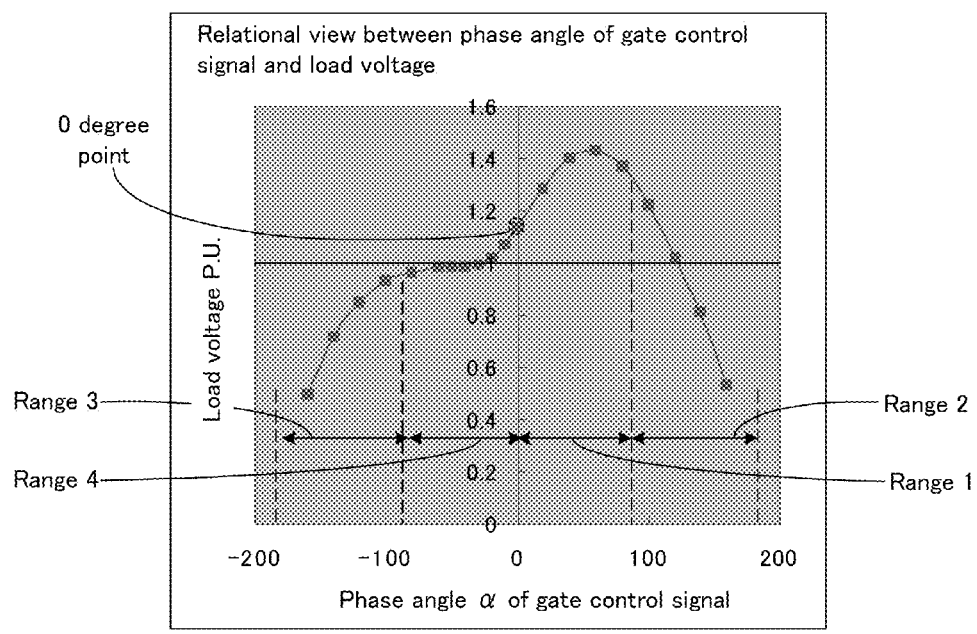
FIG. 12 is shows relation between the phase angle α of the gate control signal and load voltage.

Further, FIG. 12 illustrates relation between the phase angle α of the gate control signal and load voltage $V_{load}$.

More specifically, regarding the range of the phase angle α of the gate control signal, a range between 0 degree and 90 degrees is called "range 1", a range between 90 degrees and 180 degrees is called "range 2", a range between −180 degrees and −90 degrees is called "range 3", a range between −90 degrees and 0 degree is called "range 4", and the point of 0 degree is called "the zero degree point". Then, the above naming is appropriately used.

[First Embodiment]

An Alternating Voltage Control Apparatus Utilizing a Full-Bridge Type MERS

FIG. 1 is a circuit block diagram illustrating a configuration of an alternating voltage control apparatus of the first embodiment according to the present embodiment.

More specifically, the alternating voltage control apparatus of the first embodiment according to the present invention is serially inserted between the alternating-current power source 3 and an inductive load 5 and controls voltage (i.e., load voltage) to be supplied to the inductive load 5.

The alternating voltage control apparatus of FIG. 1 includes a full-bridge type magnetic energy recovery switch circuit 10 (hereinafter, a magnetic energy recovery switch is simply called "MERS") including a full-bridge circuit constituted with a first reverse conduction type semiconductor switch leg forming a first alternating-current terminal AC1 at a connecting point between a negative side of a self-turn-off device constituting a first reverse conduction type semiconductor switch SW1 (hereinafter, simply called "the negative side of the reverse conduction type semiconductor switch") and a positive side of a self-turn-off device constituting a second reverse conduction type semiconductor switch SW2 (hereinafter, simply called "the positive side of the reverse conduction type semiconductor switch") and a second reverse conduction type semiconductor switch leg forming a second alternating-current terminal AC2 at a connecting point between a negative side of a third reverse conduction type semiconductor switch SW3 and a positive side of a fourth reverse conduction type semiconductor switch SW4, having a positive terminal DCP formed by connecting the positive side of the first reverse conduction type semiconductor switch SW1 and the positive side of the third reverse conduction type semiconductor switch SW3 and having a negative terminal DCN formed by connecting the negative side of the second reverse conduction type semiconductor switch SW2 and the negative side of the fourth reverse conduction type semiconductor switch SW4, as the reverse conduction type semiconductor switch being a circuit constituting with a self-turn-off device and a diode while a positive side of the self-turn-off device and a negative side of the diode is connected and a negative side of the self-turn-off device and a positive side of the diode is connected (hereinafter, simply called "reversely parallel" connection) or an equivalent semiconductor element (hereinafter, simply called "reverse conduction type semiconductor switch"), and a capacitor C connected between the positive terminal DCP and the negative terminal DCN of the full-bridge circuit; an alternating-current reactor Lac having one end connected to the first alternating-current terminal AC1 of the full-bridge type MERS circuit 10; a step-down transformer 9 having a primary side connected to the alternating-current power source 3 and having one end of a secondary side connected to the other end of the alternating-current reactor Lac; and control means 4.

The second alternating-current terminal AC2 is connected to the inductive load 5.

The control means 4 controls ON/OFF states of the reverse conduction type semiconductor switches so that the self-turn-off devices constituting the two reverse conduction type semiconductor switches of a second pair to be in a blocked state (hereinafter, simply called "an OFF state of the reverse conduction type semiconductor switch") when the self-turn-off devices constituting the two reverse conduction type semiconductor switches of a first pair are in a conductive state (hereinafter, simply called "an ON state of the reverse conduction type semiconductor switch") and the second pair is to be in an ON state when the first pair is in an OFF state, assuming that the first reverse conduction type semiconductor switch SW1 and the fourth reverse conduction type semiconductor switch SW4 are to be the first pair and the second reverse conduction type semiconductor switch SW2 and the third reverse conduction type semiconductor switch SW3 are to be the second pair.

Further, the control means 4 controls voltage to be applied to the inductive load 5 to generate voltage compensating reactance voltage of the inductive load 5 at the capacitor C by controlling a phase of a gate control signal in synchronization with a voltage phase of the alternating-current power source 3 when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

Next, an operational state of the alternating voltage control apparatus of the first embodiment according to the present invention will be described with reference to FIG. 13.

Figure 13:
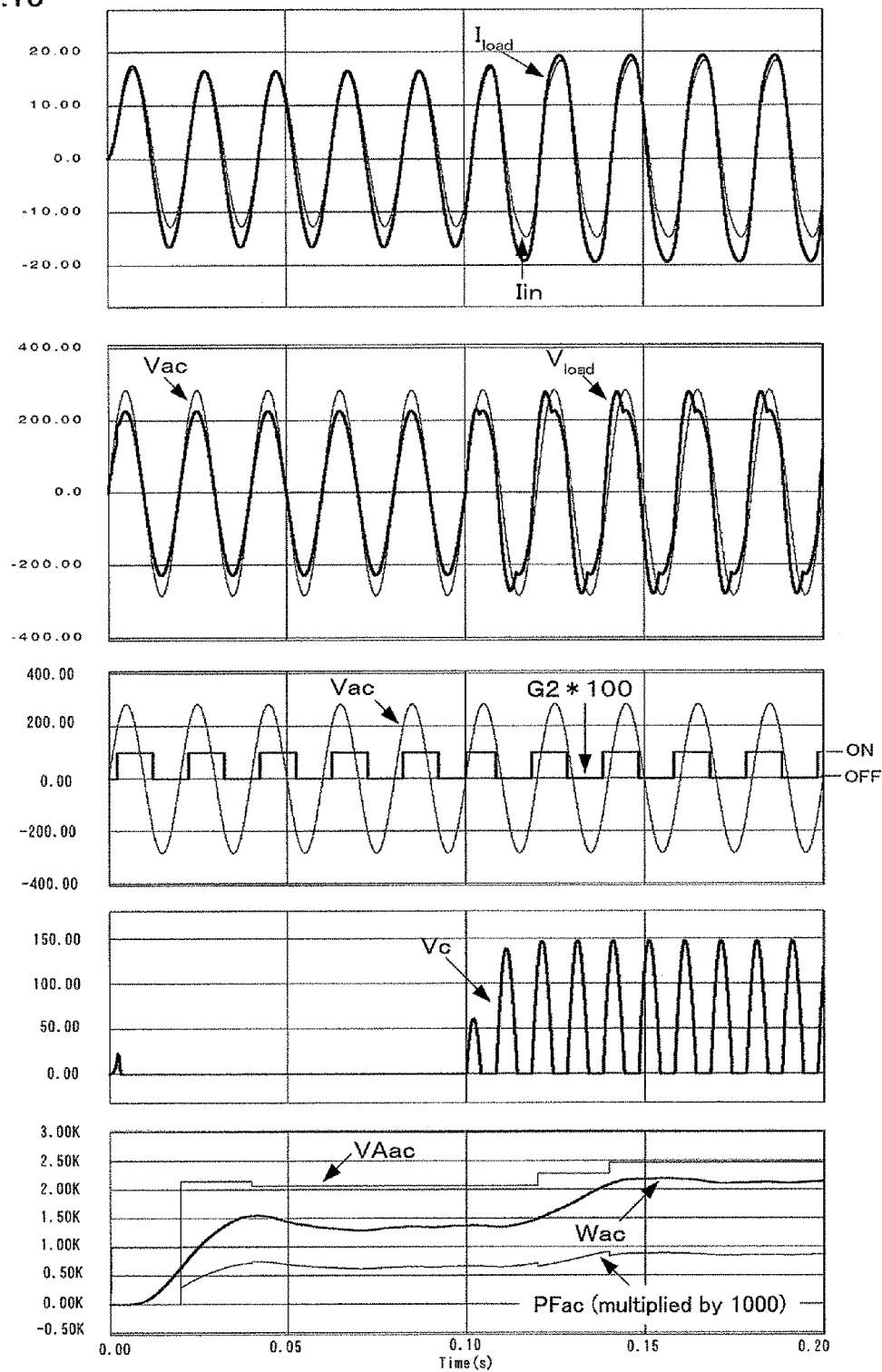
FIG. 13 shows a computer simulation result of the configuration of the first embodiment of the present invention.

More specifically, FIG. 13 shows a computer simulation result with the circuit block diagram illustrated in FIG. 1 when utilizing the following circuit constants.
<Circuit Constants of FIG. 13>

| | |
|---|---|
| Effective voltage of the alternating-current power source 3 (Vac_rms): | 200 Vrms |
| Frequency of the alternating-current power source 3 (fac): | 50 Hz |
| Winding number ratio of the step-down transformer 9: | Primary-side:Secondary-side = 200:40 |
| Inductance of the alternating-current reactor Lac (Lac): | 0.1 mH |
| Electrostatic capacity of the capacitor C (C): | 200 μF |
| Inductance of the inductive load 5 (L): | 30 mH |
| Equivalent resistance of the inductive load 5 (R): | 10 Ω |

FIG. 13 shows waveforms of current Iin to be supplied from the alternating-current power source 3, current (i.e., load current) $I_{load}$ flowing through the inductive load 5, voltage Vac of the alternating-current power source 3, voltage (i.e., load voltage) $V_{load}$ to be supplied to the inductive load, a scale-up gate control signal G2 of the second reverse conduction type semiconductor switch SW2 with the voltage Vac of the alternating-current power source 3, voltage Vc between both ends of the capacitor C, apparent voltage VAac measured at the alternating-current power source 3, effective electric power Wac measured at the alternating-current power source 3, and a power factor PFac measured at the alternating-current power source 3 (here, the power factor PFac is shown as being multiplied by a thousand).

The step-down transformer 9 is inserted between the alternating-current power source 3 and the alternating voltage control apparatus of the first embodiment according to the present invention, so that stepping-down by 20% from the voltage Vac of the alternating-current power source 3 is performed as from 200 Vrms to 160 Vrms. The alternating-current reactor Lac is selected to be 0.1 mH. In order to supply the load voltage $V_{load}$ being higher than the voltage Vac of the alternating-current power source 3, the inductance capacity is selected to be smaller corresponding thereto. When the phase angle α of the gate control signal is "advanced", stepping-up of the load voltage $V_{load}$ is occurring from the voltage stepped-down by 20% from the voltage Vac of the alternating-current power source 3.

The control means 4 sets the phase angle α of the gate control signal at −45 degrees (i.e., delayed) from time 0 to time 0.1 second and subsequently sets the phase angle α of the gate control signal at 30 degrees (i.e., advanced) to step-up the load voltage $V_{load}$.

It can be seen from FIG. 13 that the load voltage $V_{load}$ is stepped-up from 160 Vrms to 200 Vrms.

Next, features of the alternating voltage control apparatus of the first embodiment according to the present invention will be described.

The electrostatic capacity (C) of the capacitor C may be extremely small capacity only for absorbing (i.e., the capacitor is charged) and releasing (i.e., the capacitor is discharged) magnetic energy of the inductive load 5 due to resonance with the inductance (L) of the inductive load 5. That is, the capacity is only required to correspond to absorbing and releasing of the magnetic energy of the inductive load 5 by the amount of a half cycle of the alternating-current power source 3. The capacity and purpose of the capacitor C are completely different from those of a smoothing capacitor having large capacity to stably supply direct-current voltage utilized in a typical voltage type PWM inverter circuit.

Further, the capacitor C absorbs and releases the magnetic energy ($\frac{1}{2}(L(I_{load})^2)$) for each half cycle of the alternating-current power source 3 as electrostatic energy ($\frac{1}{2}(C(Vc)^2)$). The voltage Vc between both ends of the capacitor C is characterized in being approximate 0 V from a peak in synchronization with each half cycle of the alternating-current power source 3.

Further, the positional relation of potential between the positive terminal DCP and the negative terminal DCN of the full-bridge type MERS circuit 10 remains the same. Accordingly, a polar capacitor can be used as the capacitor C.

Further, by setting the resonance frequency (fres) determined from values of the electrostatic capacity (C) of the capacitor C and the inductance (L) of the inductive load 5 to be close to the frequency (fac) of the alternating-current power source 3, it becomes possible to reduce occurrence of higher harmonics of voltage and current due to the alternating voltage control apparatus of the first embodiment according to the present invention.

Further, by setting the resonance frequency (fres) determined from the values of the electrostatic capacity (C) of the capacitor C and the inductance (L) of the inductive load 5 to be equal to or higher than the frequency (fac) of the alternating-current power source 3, it becomes possible to perform soft switching operation as the self-turn-off device constituting the reverse conduction type semiconductor switch is at approximate zero voltage and zero current when being turned on and the self-turn-off device constituting the reverse conduction type semiconductor switch is at approximate zero voltage when being turned off.

Further, since the capacitor C is with voltage width of a voltage range for compensating reactance voltage of the inductive load 5, contributory voltage of the capacitor C can be lowered. It can be seen from FIG. 13 that the voltage Vc between both ends of the capacitor C is 150 V at maximum although the voltage at the secondary side of the step-down transformer 9 is 160 Vrms (here, the maximum voltage is 226 V).

Further, by setting the range of the phase angle α of the gate control signal to be between 0 degree and 90 degrees (i.e., the range of range 1 in FIG. 12) and between 0 degree and −180 degrees (i.e., the range of range 3 and range 4 in FIG. 12), deformation occurring at the voltage waveform and the current waveform to be applied to the inductive load 5 can be reduced.

Further, by inserting the alternating-current reactor Lac, a current rising edge at the time of switching of the reverse conduction type semiconductor switch is possible to be gradual and stable soft switching operation can be performed. In addition, there is a feature that the inductance (Lac) of the alternating-current reactor Lac is only required to be extremely small.

[Second Embodiment]

Figure 2:
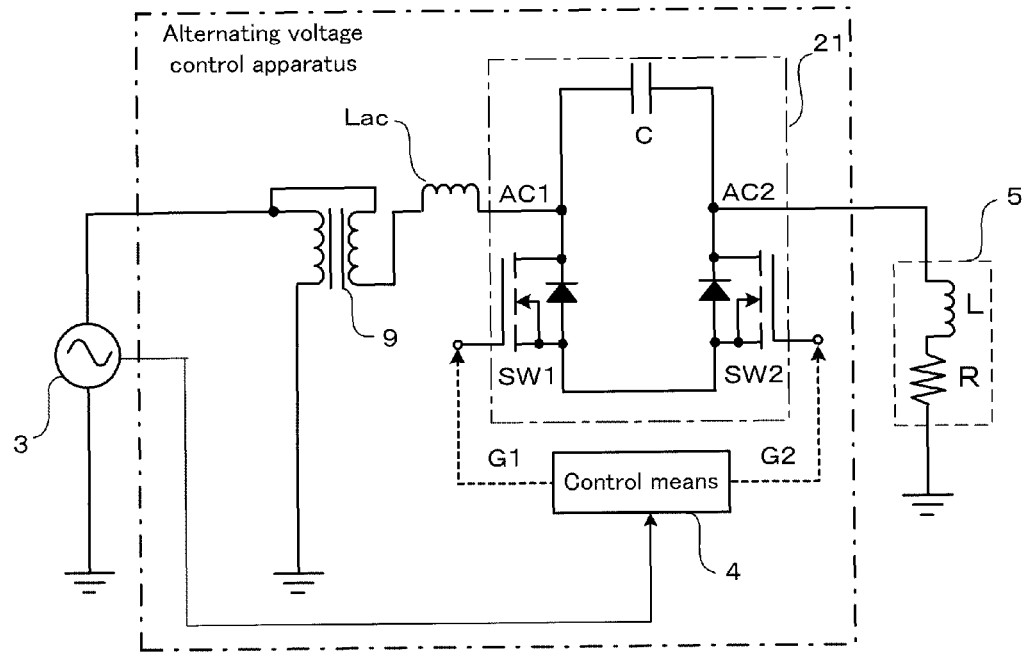
FIG. 2 is a circuit block diagram illustrating a configuration of the second embodiment according to the present invention.

An Alternating Voltage Control Apparatus Utilizing a Single-Capacitor Lateral Type Half-Bridge MERS FIG. 2 is a circuit block diagram illustrating a configuration of an alternating voltage control apparatus of the second embodiment according to the present invention.

More specifically, the alternating voltage control apparatus of FIG. 2 is serially inserted between the alternating-current power source 3 and the inductive load 5 and controls voltage (i.e., load voltage) to be supplied to the inductive load 5.

The alternating voltage control apparatus of FIG. 2 includes a single-capacitor lateral type half-bridge MERS circuit 21 including a reverse conduction type semiconductor switch leg as connecting a negative side of a first reverse conduction type semiconductor switch SW1 and a negative side of a second reverse conduction type semiconductor switch SW2, and a capacitor C connected between a first alternating-current terminal AC1 being a positive side of the first reverse conduction type semiconductor switch SW1 and a second alternating-current terminal AC2 being a positive side of the second reverse conduction type semiconductor switch SW2; an alternating-current reactor Lac having one end connected to the first alternating-current terminal AC1 of the single-capacitor lateral type half-bridge MERS circuit 21; a step-down transformer 9 having a primary side connected to the alternating-current power source 3 and having one end of a secondary side connected to the other end of the alternating-current reactor Lac; and control means 4.

The second alternating-current terminal AC2 is connected to the inductive load 5.

The control means 4 controls ON/OFF states of the reverse conduction type semiconductor switches so that the first reverse conduction type semiconductor switch SW1 and the second reverse conduction type semiconductor switch SW2 are not to be simultaneously in an OFF state while setting the second reverse conduction type semiconductor switch SW2 in an OFF state when the first reverse conduction type semiconductor switch SW1 is in an ON state and setting the second reverse conduction type semiconductor switch SW2 in an ON state when the first reverse conduction type semiconductor switch SW1 is in an OFF state.

Further, the control means 4 controls voltage to be applied to the inductive load 5 to generate voltage compensating reactance voltage of the inductive load 5 at the capacitor C by controlling a phase of a gate control signal in synchronization with a voltage phase of the alternating-current power source 3 when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

Figure 3:
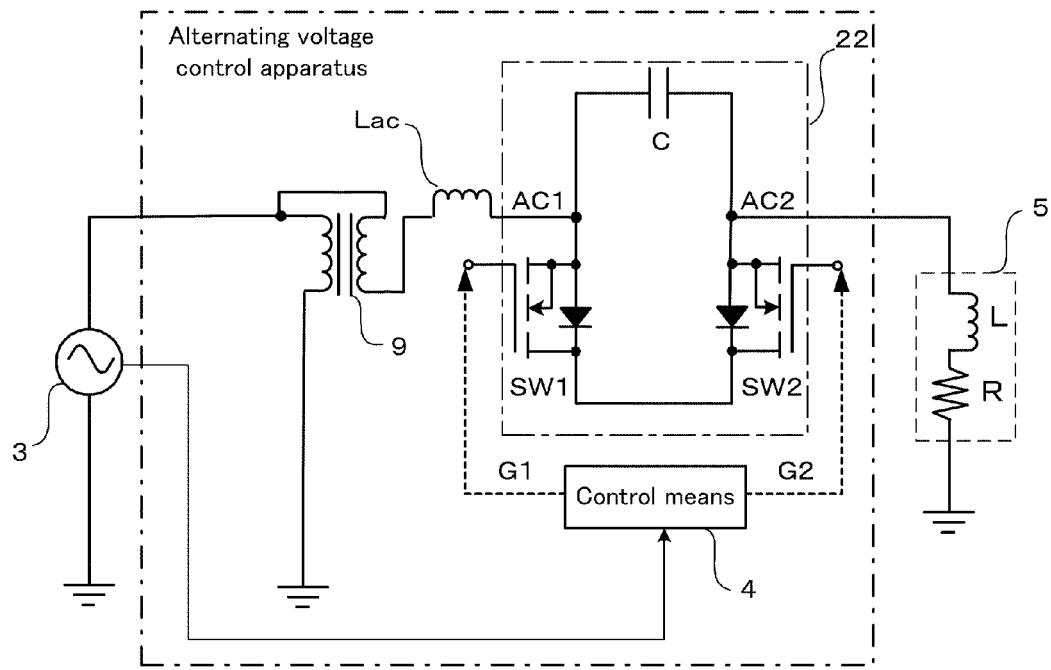
FIG. 3 is a circuit block diagram illustrating a configuration that both of positive sides of two reverse conduction type semiconductor switches are mutually shared in the second embodiment according to the present invention.

FIG. 3 is a circuit block diagram illustrating a configuration that both of the positive sides of the two reverse conduction type semiconductor switches are mutually shared in the second embodiment according to the present invention.

More specifically, both of the positive sides of the first reverse conduction type semiconductor switch SW1 and the second reverse conduction type semiconductor switch SW2 are connected as respectively interchanging the connection polarities thereof in the alternating voltage control apparatus of the second embodiment according to the present invention. The above has the same functions, operation and effects as those of the second embodiment according to the present invention.

The similar configuration can be applied to a case that a circuit having a P-channel power MOSFET, a PNP transistor and a diode connected in reversely parallel is adopted for the reverse conduction type semiconductor switch.

Next, features of the alternating voltage control apparatus of the second embodiment according to the present invention will be described.

Basic operation and features of the alternating voltage control apparatus of the second embodiment according to the present invention are similar to those of the alternating voltage control apparatus of the first embodiment according to the present invention. In the following, characteristic points of the alternating voltage control apparatus of the second embodiment according to the present invention will be described.

Since the positional relation of potential between the first alternating-current terminal AC1 and the second alternating-current terminal AC2 of the single-capacitor lateral type half-bridge MERS circuit 21 is interchanged every time corresponding to variation of the voltage phase of the alternating-current power source 3, a non-polar capacitor is used as the capacitor C.

Further, by setting the resonance frequency (fres) determined from values of the electrostatic capacity (C) of the capacitor C and the inductance (L) of the inductive load 5 to be equal to or higher than the frequency (fac) of the alternating-current power source 3, it becomes possible to perform soft switching operation as the self-turn-off device constituting the reverse conduction type semiconductor switch is at approximate zero voltage when being turned on and turned off.

Further, since only two reverse conduction type semiconductor switches are required to be used, there is a feature that the switching loss is decreased by half compared to the alternating voltage control apparatus of the first embodiment according to the present invention. In addition, the configuration of the alternating voltage control apparatus of the second embodiment according to the present invention can be simplified.

Further, in the alternating voltage control apparatus of the second embodiment according to the present invention, when ON/OFF states of the reverse conduction type semiconductor switches are interchanged in the state that charges remain at the capacitor C, the capacitor C is shorted. Then, by controlling the range of the phase angle α of the gate control signal between 0 degree and 90 degrees (i.e., the range of range 1 in FIG. 12) and between 0 degree and −90 degrees (i.e., the range of range 4 in FIG. 12), the shorting of the capacitor C can be managed. When the range of the phase angle α is to be the above range, the alternating voltage control apparatus of the second embodiment according to the present invention also has an effect that conduction loss is reduced.

Further, even when the two reverse conduction type semiconductor switches are in an OFF state, the load current Iload cannot be completely blocked since the capacitor C is in a state of being serially connected between the alternating-current power source 3 and the inductive load 5. In the case that the load current Iload is required to be completely blocked, it becomes possible to be managed by arranging a power source switch PSW between the alternating-current power source 3 and the alternating voltage control apparatus of the second embodiment according to present invention.

Figure 9:
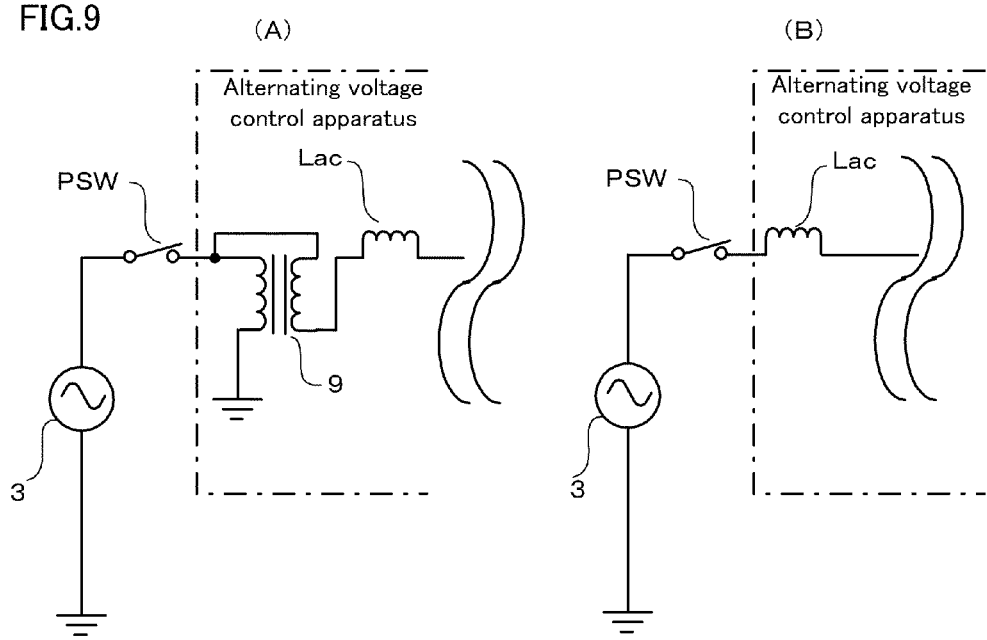
FIG. 9 illustrates excerpts from a circuit block diagram illustrating a configuration to utilize a power source switch to completely block current in the second and fourth embodiments according to the present invention.
Figure 10:
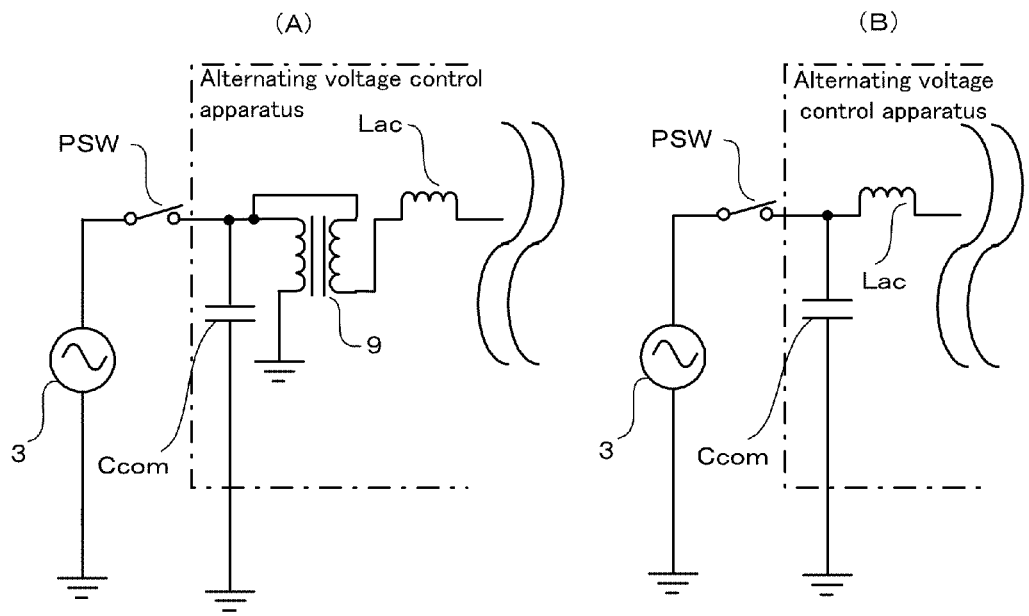
FIG. 10 illustrates excerpts from a circuit block diagram illustrating a configuration to connect a power factor compensating capacitor and to further utilize a power source switch to completely block current in the second and fourth embodiments according to the present invention.

FIGS. 9(A) and 9(B) illustrate aspects having the above power source switch PSW arranged.

[Third Embodiment]

Figure 4:
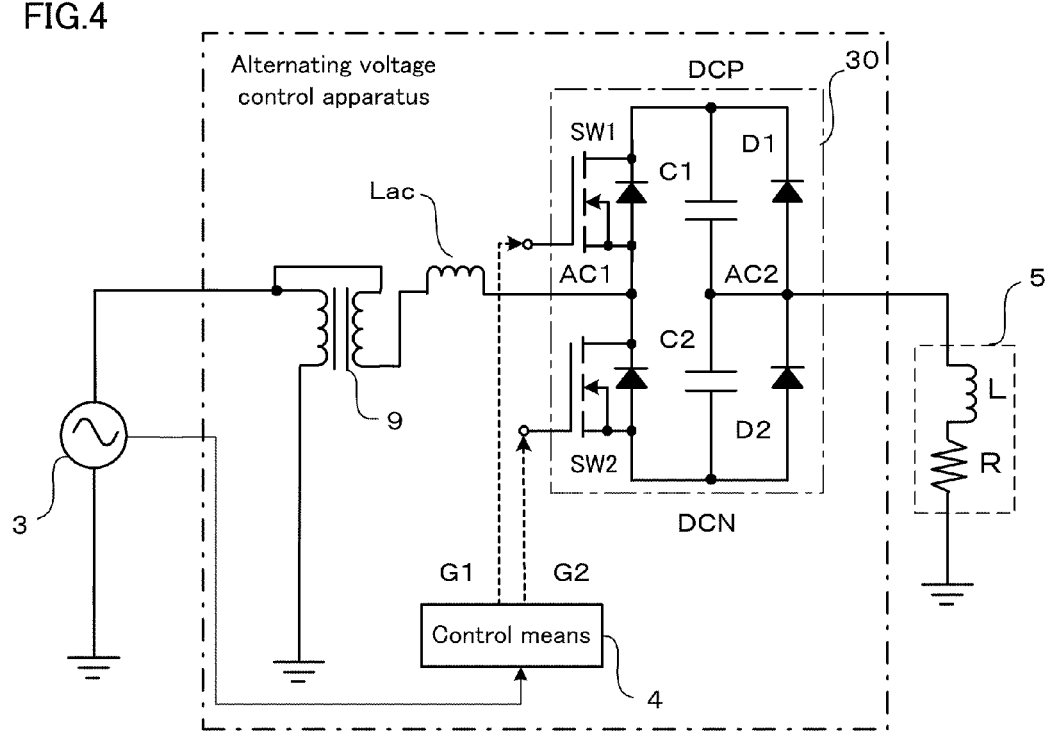
FIG. 4 is a circuit block diagram illustrating a configuration of the third embodiment according to the present invention.

An Alternating Voltage Control Apparatus Utilizing a Longitudinal Type Half-Bridge MERS Circuit FIG. 4 is a circuit block diagram illustrating a configuration of an alternating voltage control apparatus of the third embodiment according to the present invention.

More specifically, the alternating voltage control apparatus of FIG. 4 is serially inserted between the alternating-current power source 3 and the inductive load 5 and controls voltage (i.e., load voltage) to be supplied to the inductive load 5.

The alternating voltage control apparatus of FIG. 4 includes a longitudinal half-bridge MERS circuit 30 including a reverse conduction type semiconductor switch leg forming a first alternating-current terminal AC1 at a connecting point between a negative side of a first reverse conduction type semiconductor switch SW1 and a positive side of a second reverse conduction type semiconductor switch SW2, and a capacitor circuit constituted with a first capacitor clamp circuit having a first diode D1 and a first capacitor C1 connected in parallel and a second capacitor clamp circuit having a second diode D2 and a second capacitor C2 connected in parallel as forming a second alternating-current terminal AC2 at a connecting point between a positive side of the first diode D1 and a negative side of the second diode D2, having a positive terminal DCP formed at a connecting point between a positive side of the first reverse conduction type semiconductor switch SW1 and a negative side of the first diode D1 and having a negative terminal DCN formed at a connecting point between a negative side of the second reverse conduction type semiconductor switch SW2 and a positive side of the second diode D2; an alternating-current reactor Lac having one end connected to the first alternating-current terminal AC1 of the longitudinal type half-bridge MERS circuit 30; a step-down transformer 9 having a primary side connected to the alternating-current power source 3 and having one end of a secondary side connected to the other end of the alternating-current reactor Lac; and control means 4.

The second alternating-current terminal AC2 is connected to the inductive load 5.

The control means 4 controls ON/OFF states of the reverse conduction type semiconductor switches so that the first reverse conduction type semiconductor switch SW1 and the second reverse conduction type semiconductor switch SW2 are not to be simultaneously in an ON state while setting the second reverse conduction type semiconductor switch SW2 in an OFF state when the first reverse conduction type semiconductor switch SW1 is in an ON state and setting the second reverse conduction type semiconductor switch SW2 in an ON state when the first reverse conduction type semiconductor switch SW1 is in an OFF state.

Further, the control means 4 controls voltage to be applied to the inductive load 5 to generate voltage compensating reactance voltage of the inductive load 5 at the first capacitor C1 and the second capacitor C2 by controlling a phase of a gate control signal in synchronization with a voltage phase of the alternating-current power source 3 when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

Next, features of the alternating voltage control apparatus of the third embodiment according to the present invention will be described.

Basic operation and features of the alternating voltage control apparatus of the third embodiment according to the present invention are similar to those of the alternating voltage control apparatus of the first embodiment according to the present invention. In the following, characteristic points of the alternating voltage control apparatus of the third embodiment according to the present invention will be described.

The electrostatic capacity (C1) of the first capacitor C1 and the electrostatic capacity (C2) of the second capacitor C2 may be extremely small capacity only for absorbing (i.e., the capacitor is charged) and releasing (i.e., the capacitor is discharged) magnetic energy of the inductive load 5 due to resonance with the inductance (L) of the inductive load 5. That is, the capacity is only required to correspond to absorbing and releasing of the magnetic energy of the inductive load 5 by the amount of a half cycle of the alternating-current power source 3. The capacity and purpose of the first capacitor C1 and the second capacitor C2 are completely different from those of a smoothing capacitor having large capacity to stably supply direct-current voltage utilized in a typical voltage type PWM inverter circuit.

Further, the first capacitor C1 and the second capacitor C2 alternately absorb and release the magnetic energy (½(L$(I_{load})^2$)) in synchronization with each half cycle of the alternating-current power source 3 as electrostatic energy (½(C1 (Vc1)$^2$), ½(C2(Vc2)$^2$)). The voltage Vc1 between both ends of the first capacitor C1 and the voltage Vc2 between both ends of the second capacitor C2 are characterized in alternately being approximate 0 V from a peak in synchronization with each half cycle of the alternating-current power source 3.

Further, the positional relation of potential between the positive terminal DCP and the negative terminal DCN of the longitudinal type half-bridge MERS circuit 30 remains the same. Accordingly, polar capacitors can be used as the first capacitor C1 and the second capacitor C2.

Further, by setting the first resonance frequency (fres1) determined from values of the electrostatic capacity (C1) of the first capacitor C1 and the inductance (L) of the inductive load 5 and the second resonance frequency (fres2) determined from values of the electrostatic capacity (C2) of the second capacitor C2 and the inductance (L) of the inductive load 5 respectively to be close to the frequency (fac) of the alternating-current power source 3, it becomes possible to reduce occurrence of higher harmonics of voltage and current due to the alternating voltage control apparatus of the third embodiment according to the present invention.

Further, by setting the first resonance frequency (fres1) determined from the values of the electrostatic capacity (C1) of the first capacitor C1 and the inductance (L) of the inductive load 5 and the second resonance frequency (fres2) determined from the values of the electrostatic capacity (C2) of the second capacitor C2 and the inductance (L) of the inductive load 5 respectively to be equal to or higher than the frequency (fac) of the alternating-current power source 3, it becomes possible to perform soft switching operation as the self-turn-off device constituting the reverse conduction type semiconductor switch is at approximate zero voltage and zero current when being turned on and the self-turn-off device constituting the reverse conduction type semiconductor switch is at approximate zero voltage when being turned off.

Further, since the first capacitor C1 and the second capacitor C2 are with voltage width of a voltage range for compensating reactance voltage of the inductive load 5, contributory voltage of the respective capacitors can be lowered. In addition, since the first capacitor C1 and the second capacitor C2 are alternately charged and discharged in synchronization with each half cycle of the alternating-current power source 3, there is a feature that current burden per each capacitor becomes to be a half compared to that of the alternating voltage control apparatus of the first embodiment according to the present invention.

Further, since only two reverse conduction type semiconductor switches are required to be used, there is a feature that the switching loss is decreased by half compared to the alternating voltage control apparatus of the first embodiment according to the present invention. In addition, the configuration of the alternating voltage control apparatus of the third embodiment according to the present invention can be simplified.

Further, being similar to the first embodiment according to the present invention, the range of the phase angle α of the gate control signal can be set to be between 0 degree and 90 degrees (i.e., the range of range 1 in FIG. 12) and between 0 degree and −180 degrees (i.e., the range of range 3 and range 4 in FIG. 12). However, when the phase angle α of the gate control signal is set between −90 degrees and −180 degrees (i.e., the range of range 3 in FIG. 12), contributory voltage of the respective capacitors becomes high as charge remains respectively in the first capacitor C1 and the second capacitor C2. By setting the range of the phase angle α of the gate control signal to be between 0 degree and 90 degrees (i.e., the range of range 1 in FIG. 12) and between 0 degree and −90 degrees (i.e., the range of range 4 in FIG. 12), the contributory voltage of the respective capacitors can be lowered. In addition, deformation occurring at the voltage waveform and the current waveform to be applied to the inductive load 5 can be reduced.

[Fourth Embodiment]

Figure 5:
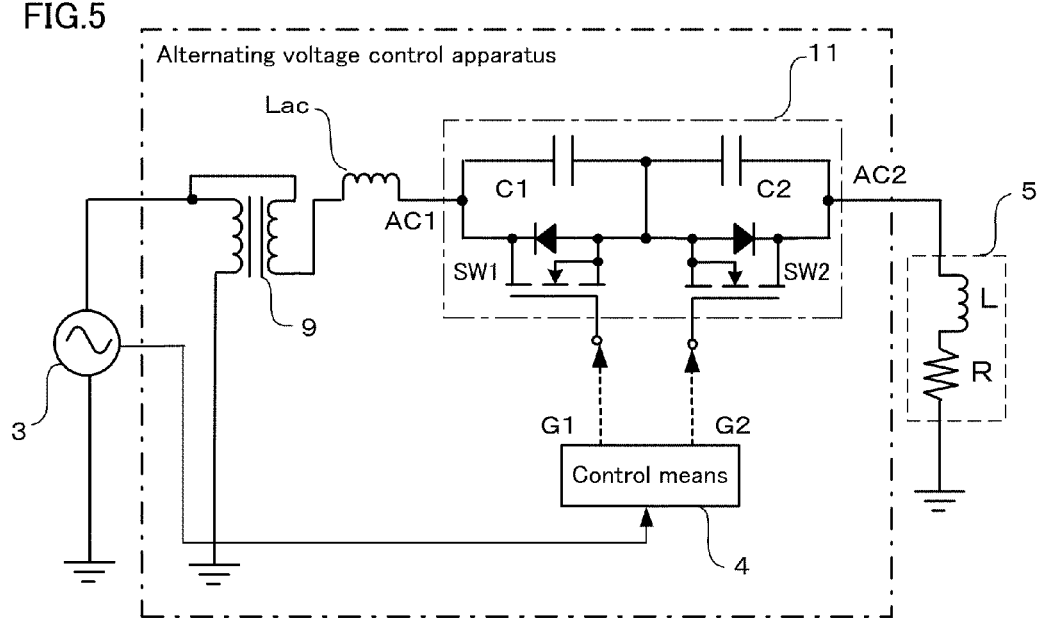
FIG. 5 is a circuit block diagram illustrating a configuration of the fourth embodiment according to the present invention.

An Alternating Voltage Control Apparatus Utilizing Double-Capacitor Lateral Type Half-Bridge MERS FIG. 5 is a circuit block diagram illustrating a configuration of an alternating voltage control apparatus of the fourth embodiment according to the present invention.

More specifically, the alternating voltage control apparatus of FIG. 5 is serially inserted between the alternating-current power source 3 and the inductive load 5 and controls voltage (i.e., load voltage) to be supplied to the inductive load 5.

The alternating voltage control apparatus of FIG. 5 includes a double-capacitor lateral type half-bridge MERS circuit 11 including a first capacitor shorted circuit having a first reverse conduction type semiconductor switch SW1 and a first capacitor C1 connected in parallel as a positive side of the first reverse conduction type semiconductor switch SW1 being a first alternating-current terminal AC1 and a second capacitor shorted circuit having a second reverse conduction type semiconductor switch SW2 and a second capacitor C2 connected in parallel as a positive side of the second reverse conduction type semiconductor switch SW2 being a second alternating-current terminal AC2, as connecting a negative side of the first reverse conduction type semiconductor switch SW1 and a negative side of the second reverse conduction type semiconductor switch SW2; an alternating-current reactor Lac having one end connected to the first alternating-current terminal AC1 of the double-capacitor lateral type half-bridge MERS circuit 11; a step-down transformer 9 having a primary side connected to the alternating-current power source 3 and having one end of a secondary side connected to the other end of the alternating-current reactor Lac; and control means 4.

The second alternating-current terminal AC2 is connected to the inductive load 5.

The control means 4 controls ON/OFF states of the reverse conduction type semiconductor switches so that the first reverse conduction type semiconductor switch SW1 and the second reverse conduction type semiconductor switch SW2 are not to be simultaneously in an ON state while setting the second reverse conduction type semiconductor switch SW2 in an OFF state when the first reverse conduction type semiconductor switch SW1 is in an ON state and setting the second reverse conduction type semiconductor switch SW2 in an ON state when the first reverse conduction type semiconductor switch SW1 is in an OFF state.

Further, the control means 4 controls voltage to be applied to the inductive load 5 to generate voltage compensating reactance voltage of the inductive load 5 at the first capacitor C1 and the second capacitor C2 by controlling a phase of a gate control signal in synchronization with a voltage phase of the alternating-current power source 3 when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

Figure 6:
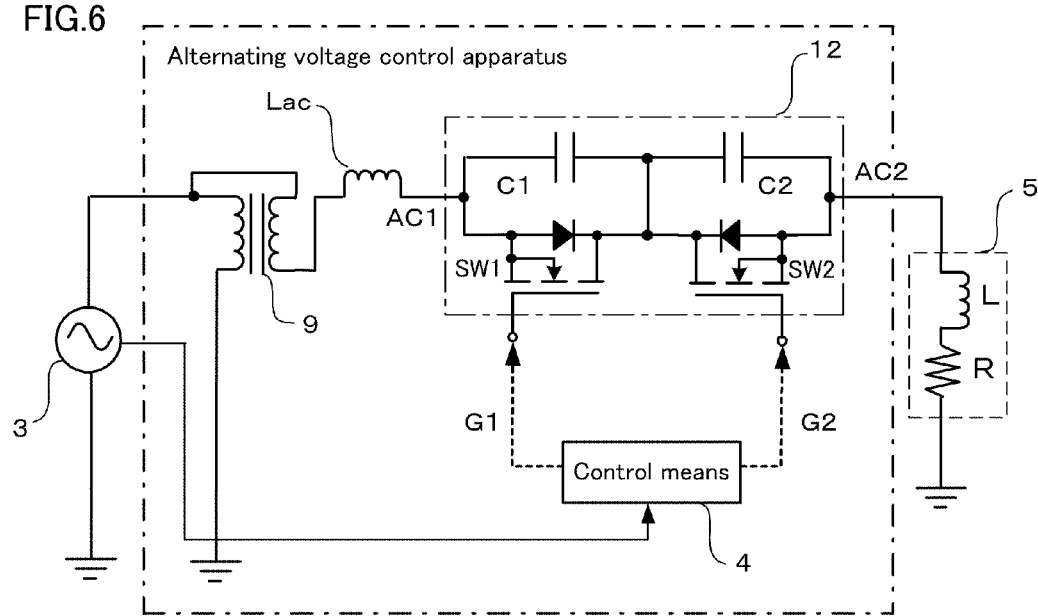
FIG. 6 is a circuit block diagram illustrating a configuration that both of positive sides of two reverse conduction type semiconductor switches are mutually shared in the fourth embodiment according to the present invention.

FIG. 6 is a circuit block diagram illustrating a configuration that both of the positive sides of the two reverse conduction type semiconductor switches are mutually shared in the fourth embodiment according to the present invention.

More specifically, both of the positive sides of the first reverse conduction type semiconductor switch SW1 and the second reverse conduction type semiconductor switch SW2 are connected as respectively interchanging the connection polarities thereof in the alternating voltage control apparatus of the fourth embodiment according to the present invention. The above has the same functions, operation and effects as those of the fourth embodiment according to the present invention.

The similar configuration can be applied to a case that a circuit having a P-channel power MOSFET, a PNP transistor and a diode connected in reversely parallel is adopted for the reverse conduction type semiconductor switch.

Basic operation and features of the alternating voltage control apparatus of the fourth embodiment according to the present invention are similar to those of the alternating voltage control apparatus of the third embodiment according to the present invention. In the following, characteristic points of the alternating voltage control apparatus of the fourth embodiment according to the present invention will be described.

Positional relation of potential between terminals of the first capacitor shorted circuit and between terminals of the second capacitor shorted circuit remain the same respectively. Accordingly, polar capacitors can be used as the first capacitor C1 and the second capacitor C2.

Further, in the alternating voltage control apparatus of the fourth embodiment according to the present invention, when ON/OFF states of the reverse conduction type semiconductor switches are interchanged in the state that charges remain at least at either the first capacitor C1 or the second capacitor C2, the capacitor at which charges remain is shorted. The above can be managed by controlling the range of the phase angle α of the gate control signal between 0 degree and 90 degrees (i.e., the range of range 1 in FIG. 12) and between 0 degree and −90 degrees (i.e., the range of range 4 in FIG. 12). When the range of the phase angle α is to be the above range, the alternating voltage control apparatus of the fourth embodiment according to the present invention also has an effect that conduction loss is reduced.

Further, even when the two reverse conduction type semiconductor switches are in an OFF state, the load current Iload cannot be completely blocked since the serial circuit of the first capacitor C1 and the second capacitor C2 is in a state of being serially connected between the alternating-current power source 3 and the inductive load 5. In the case that the load current Iload is required to be completely blocked, it becomes possible to be managed by arranging a power source switch PSW between the alternating-current power source 3 and the alternating voltage control apparatus of the fourth embodiment according to present invention. FIGS. 9(A) and 9(B) illustrate aspects having the above power source switch PSW arranged.

Furthermore, in the case that a field effect transistor or a semiconductor element having the similar structure thereto is used as the self-turn-off device constituting the reverse conduction type semiconductor switch and the control means 4 controls the reverse conduction type semiconductor switch to be in an ON state when the diode constituting the reverse conduction type semiconductor switch is in a conduction state in the forward direction, conduction loss can be reduced as being with a synchronous rectification method.

[Fifth Embodiment]

A Case Without the Step-Down Transformer

Figure 7:
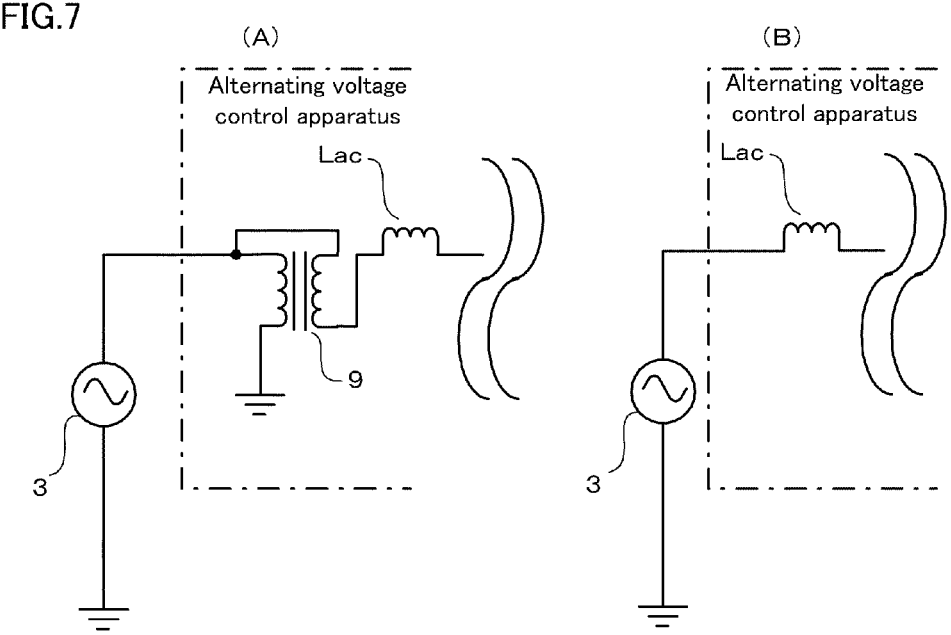
FIG. 7 illustrates excerpts from a circuit block diagram illustrating a configuration that an alternating-current power source and an alternating-current reactor are directly connected as removing a step-down transformer in the configuration of the alternating voltage control apparatus according to the present invention.

FIG. 7(B) is a circuit block diagram illustrating a part of an alternating voltage control apparatus of the fifth embodiment according to the present invention.

More specifically, FIG. 7(B) is characterized in that the alternating-current power source 3 is directly connected to the other end of the alternating-current reactor Lac to remove the function of lowering the voltage of the alternating-current power source 3 performed by the step-down transformer 9 as being superseded by enlarging the inductance capacity of the alternating-current reactor Lac of the alternating voltage control apparatus of the fifth embodiment according to the present invention.

Next, features of the alternating voltage control apparatus of the fifth embodiment according to the present invention will be described.

There is a feature that contributory voltage of the alternating-current reactor Lac may be in the order of voltage width of a range of voltage to compensate the reactance voltage of the inductive load 5.

Further, in order to perform controlling with the phase angle α of the gate control signal being close to 0 degree and to lower the voltage of the alternating-current voltage 3, the alternating-current reactor Lac is required to have large inductance capacity. However, in the case that the electric power capacity of the alternating voltage control apparatus according to the present invention is large and the alternating-current reactor Lac is to be designed corresponding to the power factor of the inductive load 5, the above may be just a substantial advantage such that the waveform of the load current Iload can be formed to be close to a fundamental wave.

[Sixth Embodiment]

An Example of Utilizing a Power Factor Compensating Capacitor

Figure 8:
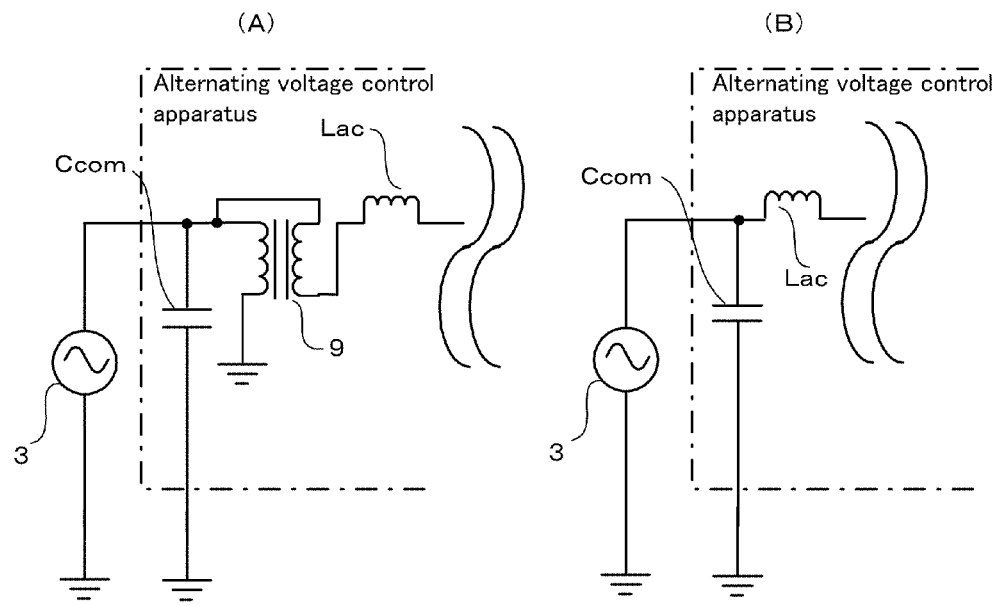
FIG. 8 illustrates excerpts from a circuit block diagram illustrating a configuration to connect a power factor compensating capacitor in the configuration of the alternating voltage control apparatus according to the present invention.

FIGS. 8(A) and 8(B) are circuit block diagrams illustrating a part of a configuration of an alternating voltage control apparatus of the sixth embodiment according to the present invention.

More specifically, FIGS. 8(A) and 8(B) are characterized in that the power factor is set to be approximate one throughout the entire range of the voltage control by the alternating voltage control apparatus according to the present invention by further arranging a power factor compensating capacitor Ccom connected between terminals of the alternating-current power source 3 in parallel.

Next, operational states of the alternating voltage control apparatus of the sixth embodiment according to the present invention will be described based on FIGS. 14(A) and 14(B).

Figure 14A:
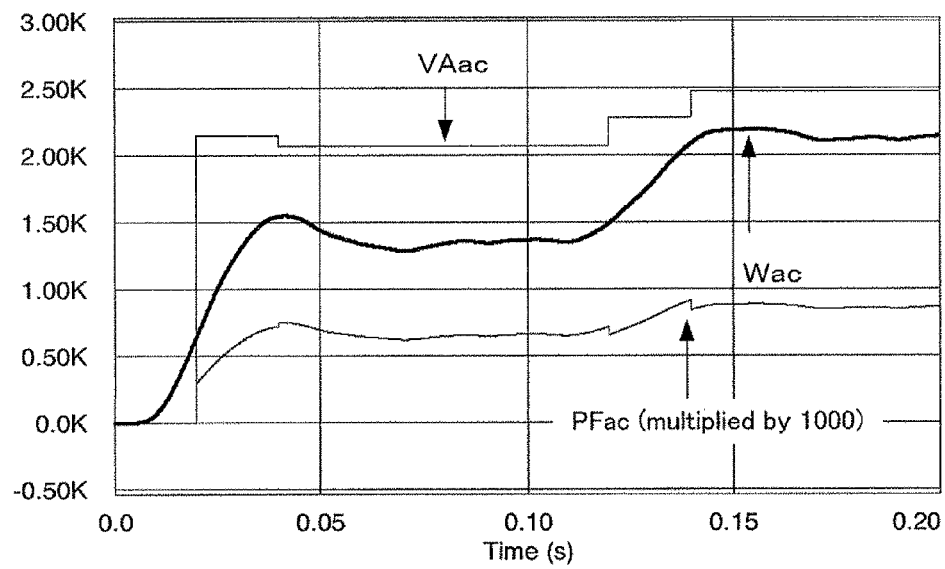
FIG. 14 shows a computer simulation result of a configuration of the sixth embodiment of the present invention.

More specifically, FIG. 14(A) shows a computer simulation result when utilizing the circuit constants of FIG. 13 in the alternating voltage control apparatus of the first embodiment according to the present invention.

Figure 14B:
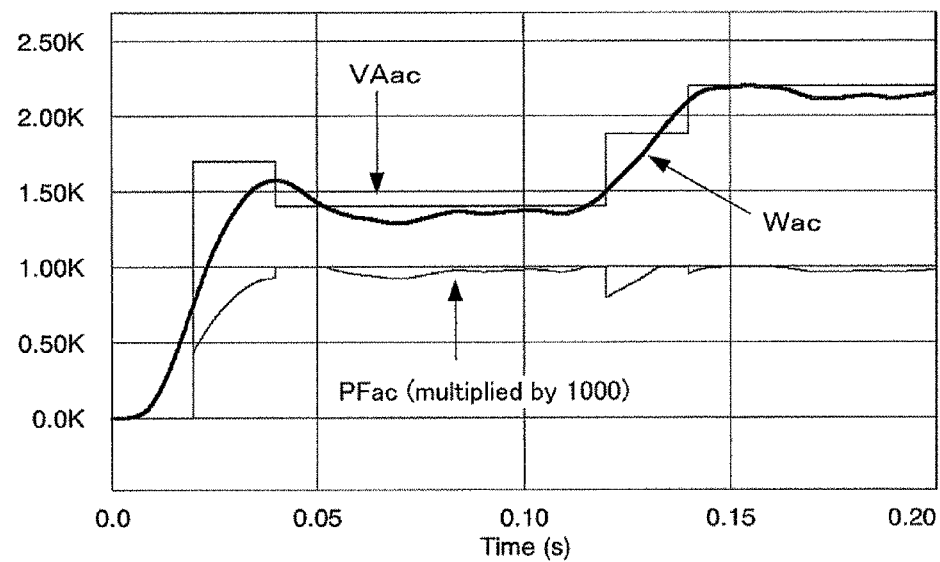

FIG. 14(B) shows a computer simulation result when utilizing the circuit constants of FIG. 13 in the alternating voltage control apparatus of the first embodiment according to the present invention and electrostatic capacity of the power factor compensating capacitor Ccom is set to be 120 μF.

FIGS. 14(A) and 14(B) respectively show waveforms of apparent voltage VAac measured at the alternating-current power source 3, effective electric power Wac measured at the alternating-current power source 3, and a power factor PFac measured at the alternating-current power source 3 (here, the power factor PFac is shown as being multiplied by a thousand).

Comparing FIG. 14(A) and FIG. 14(B), it can be confirmed that the power factor is being approximate one even though the phase angle α of the gate control signal of the alternating voltage control apparatus in which the power factor compensating capacitor Ccom is connected is varied from −45 degrees (i.e., delayed) to 30 degrees (i.e., advanced).

[Seventh Embodiment]

A Case that the Phase Angle of the Gate Control Signal is Continuously 0 Degree

Figure 15:
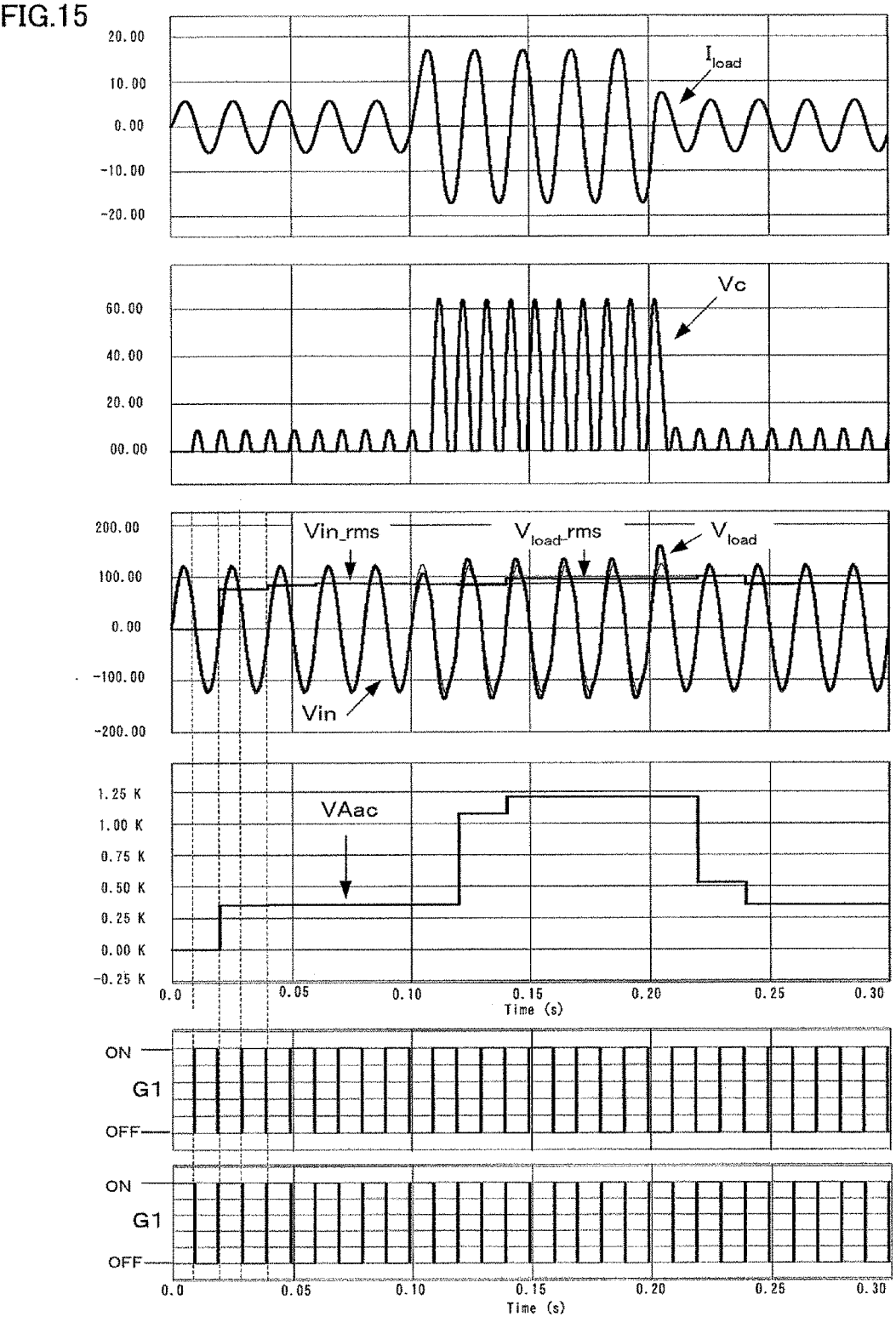
FIG. 15 shows a computer simulation result of a configuration of the seventh embodiment of the present invention.
Figure 16:
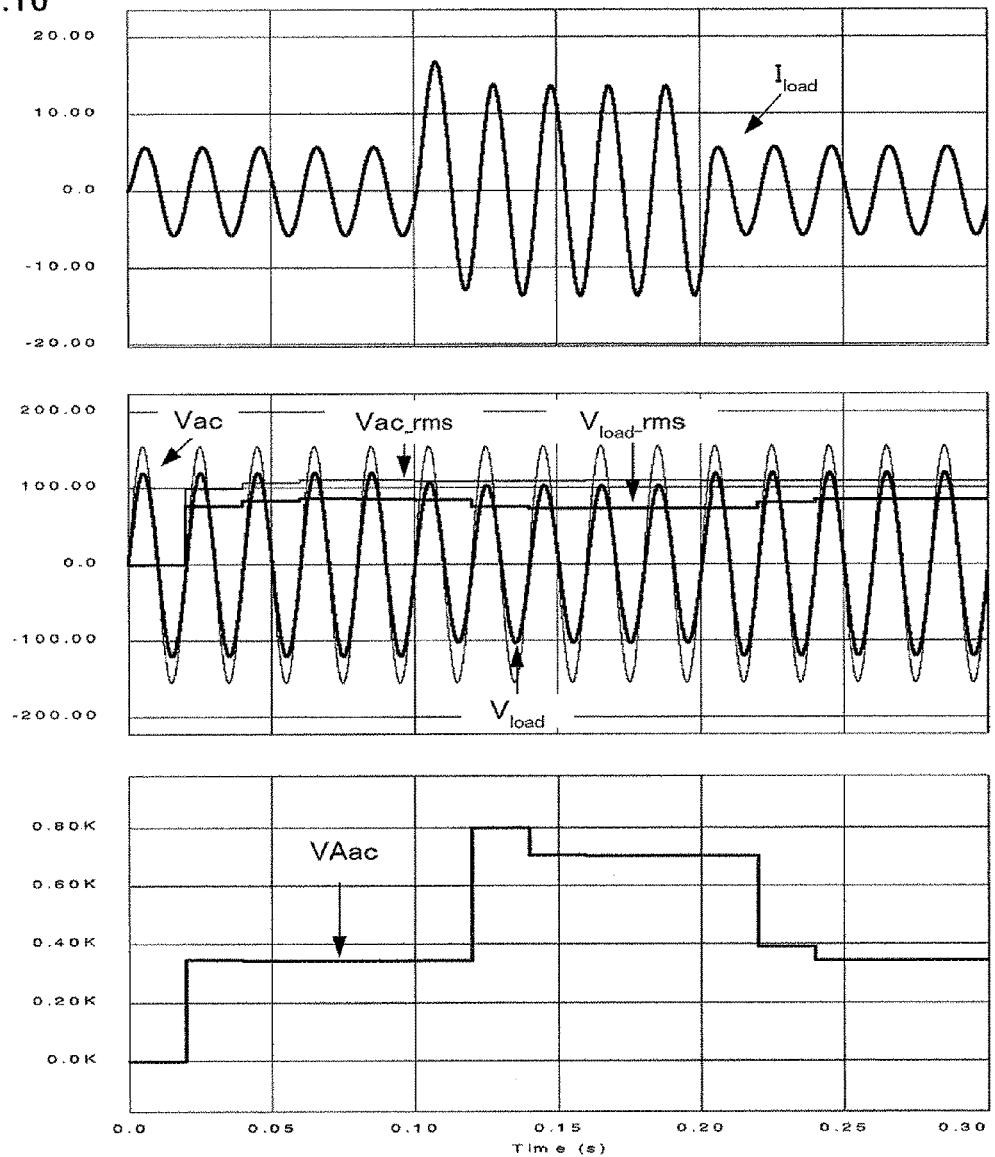
FIG. 16 shows a computer simulation result of a case without the configuration of the seventh embodiment of the present invention.

FIG. 15 shows a computer simulation result with a configuration of the seventh embodiment according to the present invention. Further, FIG. 16 shows a computer simulation result in the case that the alternating-current power source 3 and the inductive load 5 are directly connected. Further, in both cases, when the impedance of the alternating-current power source 3 is high and the load current Iload is large, the load voltage $V_{load}$ is to be lowered.

More specifically, FIG. 15 shows the computer simulation result as utilizing the following circuit constants with the circuit block diagram illustrated in FIG. 1.

<Circuit Constants of FIG. 15>

| | |
|---|---|
| Effective voltage of the alternating-current power source 3 (Vac_rms): | 110 Vrms |
| Frequency of the alternating-current power source 3 (fac): | 50 Hz |
| Winding number ratio of the step-down transformer 9: | Primary-side:Secondary-side = 110:22 |
| Inductance of the alternating-current reactor Lac (Lac): | 6.2 mH |
| Electrostatic capacity of the capacitor C (C): | 500 μF |
| Inductance of the inductive load 5 (L) and equivalent resistance of the inductive load 5 (R) from time 0 second to time 0.1 second and time 0.2 second and after: | 20 mH, 20 Ω |
| Inductance of the inductive load 5 (L) and equivalent resistance of the inductive load 5 (R) from time 0.1 second to time 0.2 second: | 12 mH, 4 Ω |

FIG. 15 shows waveforms of current (i.e., load current) Iload flowing through the inductive load 5, voltage Vc between both ends of the capacitor C, voltage Vin to be supplied to the full-bridge type MERS circuit 10, effective voltage Vin_rms to be supplied to the full-bridge type MERS circuit 10, voltage (i.e., load voltage) $V_{load}$ to be supplied to the inductive load 5, effective voltage $V_{load\_rms}$ to be supplied to the inductive load 5, apparent voltage VAac measured at the alternating-current power source 3, a gate control signal G1 of the first reverse conduction type semiconductor switch SW1, and a gate control signal G2 of the second reverse conduction type semiconductor switch SW2.

FIG. 16 shows waveforms of current (i.e., load current) Iload flowing through the inductive load 5, voltage Vac of the alternating-current voltage 3, effective voltage Vac_rms of the alternating-current power source 3, voltage (i.e., load voltage) $V_{load}$ to be supplied to the inductive load 5, effective voltage $V_{load\_rms}$ to be supplied to the inductive load 5, and apparent voltage VAac measured at the alternating-current power source 3.

In FIG. 15, the step-down transformer 9 is inserted between the alternating-current power source 3 and the alternating voltage control apparatus of the seventh embodiment according to the present invention, so that stepping-down by 20% from the voltage Vac of the alternating-current power source 3 is performed as from 110 Vrms to 88 Vrms. The alternating-current reactor Lac is selected to be 6.2 mH. The inductive load 5 is constituted with a first inductive load and a second inductive load to be simulated as the two inductive loads being connected in parallel. The first inductive load is set to be 20 mH and 20Ω. The second inductive load is set to be 30 mH and 5Ω. The second inductive load is connected only between time 0.1 second and time 0.2 second while the first inductive load is connected continuously from time 0.

The control means 4 sets the phase angle α of the gate control signal continuously at 0 degree (i.e., the zero degree point in FIG. 12). That is, the phases of the first gate signal control signal G1 of the reverse conduction type semiconductor switch SW1 and the second gate signal control signal G2 of the reverse conduction type semiconductor switch SW2 are only interchanged in synchronization with the timing that the voltage Vac of the alternating-current power source 3 becomes approximate zero voltage.

It can be confirmed from FIG. 15 that the effective voltage $V_{load\_rms}$ to be supplied to the inductive load 5 can be maintained at 100 V regardless of flowing of rush current of about 17 A from time 0.1 second to 0.2 second. Further, it is automatically performed that the voltage Vc between both ends of the capacitor C absorbs (i.e., the capacitor C is charged) and releases (i.e., the capacitor C is discharged) the amount of the rush current. Comparing to this, in FIG. 16, it can be confirmed that the effective voltage $V_{load\_rms}$ to be supplied to the inductive load 5 is lowered to 88 V during the rush current of about 17 A flows.

Next, features of the alternating voltage control apparatus of the seventh embodiment according to the present invention will be described.

Basic operation and features of the alternating voltage control apparatus of the seventh embodiment according to the present invention are similar to those of the alternating voltage control apparatus of the first embodiment according to the present invention. In the following, characteristic points of the alternating voltage control apparatus of the seventh embodiment according to the present invention will be described.

The phase angle α of the gate control signal is continuously set at 0 degree (i.e., the zero degree point in FIG. 12). That is, the phases of the first gate signal control signal G1 of the reverse conduction type semiconductor switch SW1 and the second gate signal control signal G2 of the reverse conduction type semiconductor switch SW2 are only interchanged in synchronization with the timing that the voltage Vac of the alternating-current power source 3 becomes approximate zero voltage. In alternating voltage control apparatuses of other embodiments according to the present invention, the phase angle α of the gate control signal is positively controlled. With the alternating voltage control apparatus of the seventh embodiment according to the present invention, the voltage (i.e., the load voltage) $V_{load}$ to be supplied to the inductive load 5 can be kept constant by continuously setting the phase angle α of the gate control signal at 0 degree (i.e., the zero degree point in FIG. 12). The method to continuously set the phase angle α of the gate control signal at 0 degree (i.e., the zero degree point in FIG. 12) operates effectively in alternating-current power source control apparatuses of other embodiments according to the present invention.

[Eighth Embodiment]
An Electric-Discharge Lamp Lighting Control System

It is possible to provide an electric-discharge lamp lighting control system having a feature to control brightness of an electric-discharge lamp corresponding to a purpose by connecting a single electric-discharge lamp or plural electric-discharge lamps (hereinafter, simply called an "electric-discharge lamp") having an inductive load as the inductive load 5 connected to the above alternating voltage control apparatus and varying the load voltage $V_{load}$.

Here, the circuit constants shown in FIG. 13 are values assuming a fluorescent lamp of a low power factor type or a reactor ballast type mercury-vapor lamp of which power factor is 0.7 with input of alternating-current 200 Vrms. Accordingly, it can be confirmed that the alternating voltage control apparatus according to the present invention operates effectively.

[Ninth Embodiment]
[An Induction Motor Control System]

An induction motor control system can be provided by connecting a single induction motor or plural induction motors (hereinafter, simply called an "induction motor") as the inductive load 5 connected to the above alternating voltage control apparatus. Here, the control means 4 reduces iron loss generated at the induction motor by supplying the load voltage $V_{load}$ being lower than rated voltage of the induction motor to set the phase angle α of the gate control signal not to generate voltage at the capacitor C (or the first capacitor C1 and the second capacitor C2) during steady operation of the induction motor. Further, during starting of the induction motor, the control means 4 increases starting torque by supplying the load voltage $V_{load}$ being equal to or higher than the rated voltage of the induction motor to set the phase angle α of the gate control signal to generate voltage at the capacitor C (or the first capacitor C1 and the second capacitor C2) or prevents voltage drop of the load voltage $V_{load}$ at the time of activating plural induction motors by setting the phase angle α of the gate control signal at 0 degree.

[Tenth Embodiment]

Usage in a Three-Phase Alternating-Current Circuit

In the case that three-phase alternating-current is utilized as the alternating-current power source 3, the above alternating voltage control apparatus is connected to each phase of the three-phase alternating-current and the respective control means 4 of the alternating voltage control apparatuses for the respective phases are connected with communication means to be formed as a single alternating voltage control apparatus. Then, the respective control means 4 perform adjusting of the load voltage $V_{load}$ of the respective phases obtained by the communication means to be mutually balanced, so that the alternating-current power source apparatus capable of managing unbalanced voltage of three phases can be provided.

The invention claimed is:

1. An alternating voltage control apparatus which is inserted serially between an alternating-current power source and an inductive load and which controls load voltage applied to the inductive load, comprising:
    a magnetic energy recovery switch circuit having at least two of internal semiconductor switches, a capacitor, a first alternating-current terminal, a second alternating-current terminal, a positive terminal and a negative terminal, thereby magnetic energy stored in the inductive load is recovered by the capacitor according to controlled operation of the internal semiconductor switches;
    an alternating-current reactor having one end connected to the first alternating-current terminal of the magnetic energy recovery switch circuit;
    a step-down transformer having a primary side connected to the alternating-current power source and having one end of a secondary side connected to the other end of the alternating-current reactor; and
    control circuit operatively connected to the magnetic energy recovery switches so that gate control signals supplied from the control circuit to the internal semiconductor switches controls ON/OFF states of the internal semiconductor switches;
    wherein the second alternating-current terminal is connected to the inductive load, and
    the control circuit controls voltage to be applied to the inductive load to generate voltage compensating reactance voltage of the inductive load at the capacitor by controlling a phase of a gate control signal in synchronization with a voltage phase of the alternating-current power source.

2. The alternating voltage control apparatus according to claim 1,
    wherein a value of electrostatic capacity of the capacitor is set so that resonance frequency determined from values of the electrostatic capacity of the capacitor and inductance of the inductive load is to be equal to or higher than frequency of the alternating-current power source.

3. The alternating voltage control apparatus according to claim 1,
    wherein a range of a phase angle of the gate control signal is set to be between 0 degree and 90 degrees or between 0 degree and −180 degrees in the condition that difference between phase variation of the gate control signal and voltage phase of the alternating-current power source is denoted as the phase angle of the gate control signal which is indicated by a plus angle as being "advancing" in the case that the phase variation of the gate control signal is advanced from the voltage phase of the alternating-current power source in terms of time and which is indicated by a minus angle as being "delaying" in the case that the phase variation of the gate control signal is delayed from the voltage phase of the alternating-current power source in terms of time.

4. The alternating voltage control apparatus according to claim 1,
    wherein the magnetic energy recovery switch circuit consists of a full-bridge type magnetic energy recovery switch circuit including a full-bridge circuit constituted with a first reverse conduction type semiconductor switch leg forming a first alternating-current terminal at a connecting point between a negative side of a self-turn-off device constituting a first reverse conduction type semiconductor switch (hereinafter, simply called "the negative side of the reverse conduction type semiconductor switch") and a positive side of a self-turn-off device constituting a second reverse conduction type semiconductor switch (hereinafter, simply called "the positive side of the reverse conduction type semiconductor switch") and a second reverse conduction type semiconductor switch leg forming a second alternating-current terminal at a connecting point between a negative side of a third reverse conduction type semiconductor switch and a positive side of a fourth reverse conduction type semiconductor switch, having a positive terminal formed by connecting the positive side of the first reverse conduction type semiconductor switch and the positive side of the third reverse conduction type semiconductor switch and having a negative terminal formed by connecting the negative side of the second reverse conduction type semiconductor switch and the negative side of the fourth reverse conduction type semiconductor switch, as the reverse conduction type semiconductor switch being a circuit constituting with a self-turn-off device and a diode while a positive side of the self-turn-off device and a negative side of the diode is connected and a negative side of the self-turn-off device and a positive side of the diode is connected or an equivalent semiconductor element (hereinafter, simply called "reverse conduction type semiconductor switch"), and a capacitor connected between the positive terminal and the negative terminal of the full-bridge circuit; and
    the control circuit controls ON/OFF states of the reverse conduction type semiconductor switches so that the self-turn-off devices constituting the two reverse conduction type semiconductor switches of a second pair to be in a blocked state (hereinafter, simply called "an OFF state of the reverse conduction type semiconductor switch") when the self-turn-off devices constituting the two reverse conduction type semiconductor switches of a first pair are in a conductive state (hereinafter, simply called "an ON state of the reverse conduction type semiconductor switch") and the second pair is to be in an ON state when the first pair is in an OFF state, assuming that the first reverse conduction type semiconductor switch and the fourth reverse conduction type semiconductor switch are to be the first pair and the second reverse conduction type semiconductor switch and the third reverse conduction type semiconductor switch are to be the second pair.

5. The alternating voltage control apparatus according to claim 1,
   wherein the a magnetic energy recovery switch circuit is consisting of a single-capacitor lateral type half-bridge magnetic energy recovery switch circuit including a reverse conduction type semiconductor switch leg as connecting a negative side of a first reverse conduction type semiconductor switch and a negative side of a second reverse conduction type semiconductor switch, and a capacitor connected between a first alternating-current terminal being a positive side of the first reverse conduction type semiconductor switch and a second alternating-current terminal being a positive side of the second reverse conduction type semiconductor switch; and
   wherein the control circuit controls ON/OFF states of the reverse conduction type semiconductor switches so that the first reverse conduction type semiconductor switch and the second reverse conduction type semiconductor switch are not to be simultaneously in an ON state while setting the second reverse conduction type semiconductor switch in an OFF state when the first reverse conduction type semiconductor switch is in an ON state and setting the second reverse conduction type semiconductor switch in an ON state when the first reverse conduction type semiconductor switch is in an OFF state.

6. The alternating voltage control apparatus according to claim 5,
   wherein connection polarities of the first reverse conduction type semiconductor switch and the second reverse conduction type semiconductor switch are mutually interchanged.

7. The alternating voltage control apparatus according to claim 5,
   wherein a value of electrostatic capacity of the capacitor is set so that resonance frequency determined from values of the electrostatic capacity of the capacitor and inductance of the inductive load is equal to or higher than frequency of the alternating-current power source.

8. The alternating voltage control apparatus according to claim 1,
   Wherein, the magnetic energy recovery switch circuit consists of a longitudinal half-bridge magnetic energy recovery switch circuit including a reverse conduction type semiconductor switch leg forming a first alternating-current terminal at a connecting point between a negative side of a first reverse conduction type semiconductor switch and a positive side of a second reverse conduction type semiconductor switch and, a capacitor circuit constituted with a first capacitor clamp circuit having a first diode and a first capacitor connected in parallel and a second capacitor clamp circuit having a second diode and a second capacitor connected in parallel as forming a second alternating-current terminal at a connecting point between a positive side of the first diode and a negative side of the second diode, having a positive terminal formed at a connecting point between a positive side of the first reverse conduction type semiconductor switch and a negative side of the first diode and having a negative terminal formed at a connecting point between a negative side of the second reverse conduction type semiconductor switch and a positive side of the second diode; and
   the control circuit controls ON/OFF states of the reverse conduction type semiconductor switches so that the first reverse conduction type semiconductor switch and the second reverse conduction type semiconductor switch are not to be simultaneously in an ON state while setting the second reverse conduction type semiconductor switch in an OFF state when the first reverse conduction type semiconductor switch is in an ON state and setting the second reverse conduction type semiconductor switch in an ON state when the first reverse conduction type semiconductor switch is in an OFF state, and
   the control circuit further controls voltage to be applied to the inductive load to generate voltage compensating reactance voltage of the inductive load at the first capacitor and the second capacitor by controlling a phase of a gate control signal in synchronization with a voltage phase of the alternating-current power source when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

9. The alternating voltage control apparatus according to claim 1,
   Wherein, the magnetic energy recovery switch circuit consists of a double-capacitor lateral type half-bridge magnetic energy recovery switch circuit including a first capacitor shorted circuit having a first reverse conduction type semiconductor switch and a first capacitor connected in parallel as a positive side of the first reverse conduction type semiconductor switch being a first alternating-current terminal and a second capacitor shorted circuit having a second reverse conduction type semiconductor switch and a second capacitor connected in parallel as a positive side of the second reverse conduction type semiconductor switch being a second alternating-current terminal, as connecting a negative side of the first reverse conduction type semiconductor switch and a negative side of the second reverse conduction type semiconductor switch; and
   the control circuit controls ON/OFF states of the reverse conduction type semiconductor switches so that the first reverse conduction type semiconductor switch and the second reverse conduction type semiconductor switch are not to be simultaneously in an ON state while setting the second reverse conduction type semiconductor switch in an OFF state when the first reverse conduction type semiconductor switch is in an ON state and setting the second reverse conduction type semiconductor switch in an ON state when the first reverse conduction type semiconductor switch is in an OFF state, and
   the control circuit further controls voltage to be applied to the inductive load to generate voltage compensating reactance voltage of the inductive load at the first capacitor and the second capacitor by controlling a phase of a gate control signal in synchronization with a voltage phase of the alternating-current power source when ON/OFF states of the reverse conduction type semiconductor switches are matched with duration time of an ON signal/duration time of an OFF signal of the gate control signal as the gate control signal being a signal to control the ON/OFF states of the reverse conduction type semiconductor switches.

10. The alternating voltage control apparatus according to claim 4,
wherein the self-turn-off device constituting the reverse conduction type semiconductor switch is a field effect transistor or a semiconductor element having the similar structure thereto, and
the control circuit controls the reverse conduction type semiconductor switch to be in an ON state when the diode constituting the reverse conduction type semiconductor switch is in a conduction state in the forward direction.

11. The alternating voltage control apparatus according to claim 10,
wherein connection polarities of the first reverse conduction type semiconductor switch and the second reverse conduction type semiconductor switch are mutually interchanged.

12. The alternating voltage control apparatus according to claim 11,
wherein connection polarities of the first reverse conduction type semiconductor switch and the second reverse conduction type semiconductor switch are mutually interchanged, and
connection polarities of the first capacitor and the second capacitor are mutually interchanged.

13. The alternating voltage control apparatus according to claim 9,
wherein values of electrostatic capacities of the first capacitor and the second capacitor are respectively set so that first resonance frequency determined from values of the electrostatic capacity of the first capacitor and inductance of the inductive load and second resonance frequency determined from values of the electrostatic capacity of the second capacitor and the inductance of the inductive load are set respectively to be equal to or higher than frequency of the alternating-current power source.

14. The alternating voltage control apparatus according to claim 1,
wherein the alternating-current power source is directly connected to the other end of the alternating-current reactor while removing the step-down transformer.

15. The alternating voltage control apparatus according to claim 1, further comprising a power factor compensating capacitor connected between terminals of the alternating-current power source in parallel.

16. The alternating voltage control apparatus according to any one of claim 5,
wherein a range of a phase angle of the gate control signal is set to be between 0 degree and 90 degrees or between 0 degree and −90 degrees in the condition that difference between phase variation of the gate control signal and voltage phase of the alternating-current power source is denoted as the phase angle of the gate control signal which is indicated by a plus angle as being "advancing" in the case that the phase variation of the gate control signal is advanced from the voltage phase of the alternating-current power source in terms of time and which is indicated by a minus angle as being "delaying" in the case that the phase variation of the gate control signal is delayed from the voltage phase of the alternating-current power source in terms of time.

17. An electric-discharge lamp lighting control system having a single or plural electric-discharge lamps with the inductive load connected to the alternating voltage control apparatus according to claim 1,
wherein the control circuit of the alternating voltage control apparatus controls lighting of brightness of the electric-discharge lamp corresponding to a purpose by controlling the load voltage.

18. An induction motor control system having a single or plural inductive motors with the inductive load connected to the alternating voltage control apparatus according to claim 1,
wherein the control circuit of the alternating voltage control apparatus reduces iron loss generated at the induction motor by supplying the load voltage being lower than rated voltage of the induction motor to set a phase angle of the gate control signal not to generate voltage at the capacitor or the first and second capacitors during steady operation of the induction motor, and
the control circuit increases starting torque by supplying the load voltage being equal to or higher than the rated voltage to set the phase angle of the gate control signal to generate voltage at the capacitor or the first and second capacitors during starting of the induction motor.

19. An alternating-current power source apparatus in which the alternating voltage control apparatus according to claim 1 is connected to each phase of three-phase alternating-current power source and the respective control circuit of the alternating voltage control apparatuses for the respective phases are connected with communication means,
wherein the respective control circuit perform adjusting of the load voltage of the respective phases obtained by the communication means to be mutually balanced.

20. An alternating voltage control apparatus which is inserted serially between an alternating-current power source and an inductive load and which controls load voltage applied to the inductive load, comprising:
a magnetic energy recovery switch circuit having at least two of internal semiconductor switches, a first alternating-current terminal, a second alternating-current terminal, a positive terminal and a negative terminal, wherein a capacitor is connected between the positive terminal and the negative terminal, thereby magnetic energy produced by the inductive load is recycled and reused for the next cycle of alternating current wave form;
an alternating-current voltage lowering device having one end connected to the first alternating-current terminal of the magnetic energy recovery switch circuit and the other end connected to the alternating-current power source; and
control circuit operatively connected to the magnetic energy recovery switches so that gate control signal supplied form the control circuit to the internal semiconductor switches controls ON/OFF states of the internal switches;
wherein the second alternating-current terminal is connected to the inductive load, and
the control circuit controls voltage to be applied to the inductive load to generate voltage compensating reactance voltage of the inductive load at the capacitor by controlling a phase of a gate control signal in synchronization with a voltage phase of the alternating-current power source.

* * * * *